(12) United States Patent
Herley

(10) Patent No.: US 7,653,921 B2
(45) Date of Patent: *Jan. 26, 2010

(54) SYSTEM AND METHOD FOR PROVIDING USER CONTROL OVER REPEATING OBJECTS EMBEDDED IN A STREAM

(75) Inventor: Cormac Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

This patent is subject to a terminal disclaimer.

(21) Appl. No.: 10/987,500

(22) Filed: Nov. 12, 2004

(65) Prior Publication Data

US 2005/0066352 A1     Mar. 24, 2005

Related U.S. Application Data

(60) Division of application No. 10/428,812, filed on May 2, 2003, now Pat. No. 7,523,474, which is a continuation-in-part of application No. 10/187,774, filed on Jul. 1, 2002, now Pat. No. 7,461,392.

(51) Int. Cl.
*H04N 17/00* (2006.01)
*H04N 17/04* (2006.01)
*G06K 9/64* (2006.01)
*H04N 7/16* (2006.01)

(52) U.S. Cl. .................. 725/19; 725/20; 382/100; 382/190; 382/199

(58) Field of Classification Search .............. 725/19, 725/20; 382/100, 190, 199
See application file for complete search history.

(56) References Cited

U.S. PATENT DOCUMENTS

| | | | | |
|---|---|---|---|---|
| 4,843,562 A | * | 6/1989 | Kenyon et al. | 702/73 |
| 5,481,296 A | * | 1/1996 | Cragun et al. | 725/136 |
| 6,633,651 B1 | * | 10/2003 | Hirzalla et al. | 382/100 |
| 2002/0083060 A1 | * | 6/2002 | Wang et al. | 707/10 |

\* cited by examiner

*Primary Examiner*—Christopher Kelley
*Assistant Examiner*—Reuben M Brown
(74) *Attorney, Agent, or Firm*—Lyon & Harr, LLP; Mark A. Watson

(57) ABSTRACT

Many media streams contain "objects" that repeat. Repeating objects in a media stream are defined as any section of non-negligible duration, i.e., a song, video, advertisement, jingle, etc., which would be considered to be a logical unit by a human listener or viewer. An "object controller" identifies such repeating objects as they occur, and provides an interactive user interface for allowing users to specify how individual repeating objects are to be handled either in real time, or upon subsequent occurrences of particular repeating objects. In general, the object controller includes a mechanism for identifying repeating objects, a mechanism for identifying temporal endpoints of those objects, a user interface for specifying actions to be taken when a particular object repeats within a media stream, and, in one embodiment, a buffer having sufficient length to allow for real-time deletion of objects from the media stream without obvious interruption in the str.

37 Claims, 11 Drawing Sheets

SYSTEM AND METHOD FOR PROVIDING USER CONTROL OVER REPEATING OBJECTS EMBEDDED IN A STREAM

CROSS REFERENCE TO RELATED APPLICATIONS

This application is a Divisional Application of U.S. patent application Ser. No. 10/428,812, filed May 2, 2003 now U.S. Pat. No. 7,523,474, by Cormac Herley, and entitled "A SYSTEM AND METHOD FOR PROVIDING USER CONTROL OVER REPEATING OBJECTS EMBEDDED IN A STREAM".

In addition, the parent case of this application, U.S. patent application Ser. No. 10/428,812, is a Continuation-in-Part of U.S. patent application Ser. No. 10/187,774, filed on Jul. 1, 2002 now U.S. Pat. No. 7,461,392, by Cormac Herley and entitled "A SYSTEM AND METHOD FOR IDENTIFYING AND SEGMENTING REPEATING MEDIA OBJECTS EMBEDDED IN A STREAM". Therefore, this application also claims the benefit of the priority date of U.S. patent application Ser. No. 10/187,774.

BACKGROUND

1. Technical Field

The invention is related to media stream identification and segmentation, and in particular, to a system and method for providing both automatic and real-time user control over repeating audio and/or video objects identified within one or more streams of media such as, for example, a media stream broadcast by a radio or television station.

2. Related Art

There are many existing schemes for identifying audio and/or video objects such as particular advertisements, station jingles, or songs embedded in an audio stream, or advertisements or other videos embedded in a video stream. For example, with respect to audio identification, many such schemes are referred to as "audio fingerprinting" schemes. Typically, audio fingerprinting schemes take a known object, and reduce that object to a set of parameters, such as, for example, frequency content, energy level, etc. These parameters are then stored in a database of known objects. Sampled portions of the streaming media are then compared to the fingerprints in the database for identification purposes.

Thus, in general, such schemes typically rely on a comparison of the media stream to a large database of previously identified media objects. In operation, such schemes often sample the media stream over a desired period using some sort of sliding window arrangement, and compare the sampled data to the database in order to identify potential matches. In this manner, individual objects in the media stream can be identified. This identification information is typically used for any of a number of purposes, including segmentation of the media stream into discrete objects, or generation of play lists or the like for cataloging the media stream.

However, as noted above, such schemes require the use of a preexisting database of pre-identified media objects for operation. Without such a preexisting database, identification, and/or segmentation of the media stream are not possible when using the aforementioned conventional schemes.

Further, user interaction with such media streams is limited by the ability to quickly identify both repeating objects and the start and end points of such repeating objects with the media stream.

Therefore, what is needed is a system and method for efficiently identifying and extracting or segmenting repeating media objects from a media stream such as a broadcast radio or television signal without the need to use a preexisting database of pre-identified media objects. Further, once the repeating media objects have been identified, an intelligent user interface for providing user interaction with the media stream is needed for allowing a user to control handling or processing of the media stream upon subsequent occurrences of particular repeating objects.

SUMMARY

Many media streams contain "objects" that repeat. Repeating objects in a media stream are defined as any section of non-negligible duration, i.e., a song, video, advertisement, jingle, etc., which would be considered to be a logical unit by a human listener or viewer. For example, an audio stream derived from a typical pop radio station will contain, over time, many repetitions of the same objects, including, for example, songs, jingles, advertisements, and station identifiers. Similarly, an audio/video media stream derived from a typical television station will contain, over time, many repetitions of the same objects, including, for example, commercials, advertisements, station identifiers, program "signature tunes", or emergency broadcast signals. However, these objects will typically occur at unpredictable times within the media stream, and are frequently corrupted by noise caused by any acquisition process used to capture or record the media stream.

Further, objects in a typical media stream, such as a radio broadcast, are often corrupted by voice-overs at the beginning and/or end point of each object. Further, such objects are frequently foreshortened, i.e., they are not played completely from the beginning or all the way to the end. Additionally, such objects are often intentionally distorted. For example, audio broadcast via a radio station is often processed using compressors, equalizers, or any of a number of other time/frequency effects. In addition, audio objects, such as music or a song, broadcast on a typical radio station are often cross-faded with the preceding and following music or songs, thereby obscuring the audio object start and end points, and adding distortion or noise to the object. Such manipulation of the media stream is well known to those skilled in the art. Finally, it should be noted that any or all of such corruptions or distortions can occur either individually or in combination, and are generally referred to as "noise" in this description, except where they are explicitly referred to individually. Consequently, identification of such objects and locating the endpoints for such objects in such a noisy environment is a challenging problem.

A "repeating object controller" (ROC), as described herein, operates in cooperation with an "object extractor" or fingerprint engine that identifies repeating objects and their endpoints as they occur within the media stream. Given the identification of repeating objects within the media stream, the ROC then provides an interactive user interface for allowing users to specify how individual repeating objects are to be handled either in real time, or upon subsequent occurrences of particular repeating objects. Therefore, the system and method described herein can be generally described as including a mechanism for identifying repeating objects along with their temporal endpoints, a user interface for specifying actions to be taken when a particular object repeats within a media stream, and, in one embodiment, a buffer having sufficient length to allow for real-time deletion and/or replacement of particular objects from the media stream without obvious interruption in the stream.

One example of the aforementioned "object extractor" for identifying repeating objects and the endpoints of those objects is described herein. However, it should be appreciated by those skilled in the art that the ROC is not limited by the particular object extractor described herein, and in fact is equally capable of operating with any system which can identify repeating objects and their temporal locations within a media stream.

Given this brief overview, the exemplary object extractor will first be described followed by a discussion of the ROC for making use of the information provided by the object extractor.

The object extractor described herein provides a number of advantages that makes it well suited for interacting with the ROC. For example, in addition to providing a useful technique for gathering statistical information regarding media objects within a media stream, automatic identification and segmentation of the media stream allows a user to automatically access or control particular content within the stream, or, conversely, to automatically bypass or replace unwanted content in the media stream. Further advantages include the ability to identify and store only desirable content from a media stream; the ability to identify targeted content for special processing; the ability to de-noise, or clear up any multiply detected objects, and the ability to archive the stream more efficiently by storing only a single copy of multiply detected objects.

As noted above, a system and method for automatically identifying and segmenting repeating media objects in a media stream, such as the aforementioned object extractor, identifies repeating objects by examining the stream to determine whether previously encountered objects have occurred. For example, in the audio case this would mean identifying songs as being objects that have appeared in the stream before. Similarly in the case of video derived from a television stream it can involve identifying specific advertisements, as well as station "jingles" and other frequently repeated objects. Further, such objects often convey important synchronization information about the stream. For example the theme music of a news station typically conveys time and the fact that the news report is about to begin or has just ended.

Given an audio stream which contains objects that repeat, and objects that do not repeat, the object extractor described herein automatically identifies and segments repeating media objects in the media stream, while identifying object endpoints by a comparison of matching portions of the media stream or matching repeating objects. Using broadcast audio, i.e., radio or Internet broadcast, as an example, "objects" that repeat may include, for example, songs on a radio music station, call signals, jingles, and advertisements.

Examples of objects that do not repeat may include, for example, live chat from disk jockeys, news and traffic bulletins, and programs or songs that are played only once. These different types of objects have different characteristics that for allow identification and segmentation from the media stream. For example radio advertisements on a popular radio station are generally about 30 seconds or so in length, and consist of a jingle accompanied by voice. Station jingles are generally 2 to 10 seconds in length and are mostly music and voice and repeat very often throughout the day. Songs on a "popular" music station, as opposed to classical, jazz or alternative, for example, are generally 2 to 7 minutes in length and most often contain voice as well as music.

In general, automatic identification and segmentation of repeating media objects is achieved by comparing portions of the media stream to locate regions or portions within the media stream where media content is being repeated. In a tested embodiment, identification and segmentation of repeating objects is achieved by directly comparing sections of the media stream to identify matching portions of the stream, then aligning the matching portions to identify object endpoints. In a related embodiment segments are first tested to estimate whether there is a probability that an object of the type being sought is present in the segment. If so, comparison with other segments of the media stream proceeds; but if not, further processing of the segment in question can be neglected in the interests of improving efficiency.

In another embodiment, automatic identification and segmentation of repeating media objects is achieved by employing a suite of object dependent algorithms to target different aspects of audio and/or video media for identifying possible objects. Once a possible object is identified within the stream, confirmation of an object as a repeating object is achieved by an automatic search for potentially matching objects in an automatically instantiated dynamic object database, followed by a detailed comparison between the possible object and one or more of the potentially matching objects. Object endpoints are then automatically determined by automatic alignment and comparison to other repeating copies of that object.

Another procedure for identifying repeating objects within a media stream is to simply compute audio and/or video fingerprints from segments of the media stream, then to search a fingerprint database to determine whether the current segment is known, e.g., whether it is a "match," as described above. Where the fingerprint database is initially empty, fingerprints are simply computed and used to populate the database. Eventually, when repeating objects appear in the media stream, they will be identified as repeating objects. Such fingerprint computation and comparison and techniques are well known to those skilled in the art, and will not be described in detail herein. However, it should be noted that while such techniques are useful for indicating that a known object is repeating within the stream, such techniques are not typically useful for identifying actual object endpoints. Therefore, in one embodiment, the media stream, or alternately a low dimension version of the media stream, is archived, while the associated fingerprints are stored to a fingerprint database. The archived stream is then used for identification of object endpoints as described below.

Regardless of how a match is identified, e.g., via the aforementioned direct comparison of portions of the media stream, or via the aforementioned fingerprint comparison technique, identification and segmentation of repeating objects is then achieved by aligning the matching portions of the media stream to locate object endpoints. Note that this alignment for endpoint identification, as described below, works well using either the original media stream, or using a low-dimension version of the media stream.

Approximate endpoints are located by first aligning the matching portions using any of a number of conventional techniques, such as simple pattern matching, aligning cross-correlation peaks between the matching portions, or any other conventional technique for aligning matching signals. Once aligned, the endpoints are identified by tracing backwards and forwards in the media stream, past the boundaries of the matching portions, to locate those points where the two portions of the media stream diverge. Because repeating media objects are not typically played in exactly the same order every time they are broadcast, this technique for locating endpoints in the media stream has been observed to satisfactorily locate the start and endpoints of media objects in the media stream.

Alternately, as noted above, in one embodiment, a suite of algorithms is used to target different aspects of audio and/or video media for computing parametric information useful for identifying objects in the media stream. This parametric information includes parameters that are useful for identifying particular objects, and thus, the type of parametric information computed is dependent upon the class of object being sought. Note that any of a number of well-known conventional frequency, time, image, or energy-based techniques for comparing the similarity of media objects can be used to identify potential object matches, depending upon the type of media stream being analyzed. For example, with respect to music or songs in an audio stream, these algorithms include, for example, calculating easily computed parameters in the media stream such as beats per minute in a short window, stereo information, energy ratio per channel over short intervals, and frequency content of particular frequency bands; comparing larger segments of media for substantial similarities in their spectrum; storing samples of possible candidate objects; and learning to identify any repeated objects In this embodiment, once the media stream has been acquired, the stored media stream is examined to determine a probability that an object of a sought class, i.e., song, jingle, video, advertisement, etc., is present at a portion of the stream being examined. Once the probability that a sought object exists reaches a predetermined threshold, the position of that probable object within the stream is automatically noted within the aforementioned database. Note that this detection or similarity threshold can be increased or decreased as desired in order to adjust the sensitivity of object detection within the stream.

Given this embodiment, once a probable object has been identified in the stream, parametric information for characterizing the probable object is computed and used in a database query or search to identify potential object matches with previously identified probable objects. The purpose of the database query is simply to determine whether two portions of a stream are approximately the same. In other words, whether the objects located at two different time positions within the stream are approximately the same. Further, because the database is initially empty, the likelihood of identifying potential matches naturally increases over time as more potential objects are identified and added to the database.

Once the potential matches to the probable object have been returned, a more detailed comparison between the probable object and one or more of the potential matches is performed in order to more positively identify the probable object. At this point, if the probable object is found to be a repeat of one of the potential matches, it is identified as a repeat object, and its position within the stream is saved to the database. Conversely, if the detailed comparison shows that the probable object is not a repeat of one of the potential matches, it is identified as a new object in the database, and its position within the stream and parametric information is saved to the database as noted above.

Further, as with the previously discussed embodiment, the endpoints of the various instances of a repeating object are automatically determined. For example if there are N instances of a particular object, not all of them may be of precisely the same length. Consequently, a determination of the endpoints involves aligning the various instances relative to one instance and then tracing backwards and forwards in each of the aligned objects to determine the furthest extent at which each of the instances is still approximately equal to the other instances.

It should be noted that the methods for determining the probability that an object of a sought class is present at a portion of the stream being examined, and for testing whether two portions of the stream are approximately the same both depend heavily on the type of object being sought (e.g., music, speech, advertisements, jingles, station identifications, videos, etc.) while the database and the determination of endpoint locations within the stream are very similar regardless of what kind of object is being sought.

In still further modifications of each of the aforementioned embodiments, the speed of media object identification in a media stream is dramatically increased by restricting searches of previously identified portions of the media stream, or by first querying a database of previously identified media objects prior to searching the media stream.

Further, in a related embodiment, the media stream is analyzed by first analyzing a portion of the stream large enough to contain repetition of at least the most common repeating objects in the stream. A database of the objects that repeat on this first portion of the stream is maintained. The remainder portion of the stream is then analyzed by first determining if segments match any object in the database, and then subsequently checking against the rest of the stream.

As noted above, once the repeating objects have been identified within the media stream, regardless of which of the aforementioned methods are used, the ROC then provides user interaction and control over the media stream with respect to those repeating objects.

In particular, the user interface allows the user to specify actions to be taken when a particular repeating object appears in the media stream. Examples of such actions include, but are not limited to: Fast forwarding through the repeating object; Slowing playback of the media object; Changing the media stream such as by automatically changing a station or channel being monitored; Adding a particular object to a favorites list; Rating a repeating object; Automatically raising or lowering the volume for particular repeating objects; Automatically blanking the screen when a particular repeating object is detected; Skipping to the end of particular repeating objects within the media stream; Deleting particular repeating objects from the stream so that they never appear in the media stream playback; Extracting and saving a copy of particular repeating objects from the media stream; Limiting a repeating object to a maximum number of occurrences during a pre-defined period; Limiting the relative frequency of appearance of certain objects relative to other objects; Automatically replacing particular repeating objects in the media stream with another previously stored media object; Automatically jumping from a buffered playback to a real-time playback on the occurrence of particular events, such as, for example, an emergency broadcast signal, or other particular repeating media object; Returning to a buffered playback of the media stream from a real-time playback of the media stream; and User defined actions, such as, for example, automatically dimming room lighting upon the occurrence of a particular song within the media stream.

These user specified actions associated with particular repeating objects are stored in either an object database, along with each object, or in a fingerprint database, along with each fingerprint, depending upon the embodiment that is being used to identify repeating objects within the media stream. As a result, as soon as a particular repeating object is detected within the media stream, the associated action is automatically read from the database and acted upon. Further, in one embodiment, storing the actions in a database provides the added advantage of allowing the user to edit or delete previously specified actions.

Another advantage of using such a database is that particular actions associated with particular media objects can be transmitted to another user, or loaded from a computer readable medium. For example, where one user has taken the time to identify a set of actions for a large number of songs, commercials, etc., those actions can be provided to another user by simply importing the first user's database, or a portion of that database. One simple example of this concept is in the case where a parent does not want a child to listen to a particular music artist. Simply importing a preexisting database listing that artist's music, along with associated actions to skip, delete, or replace that music as it occurs within the stream will allow the parent to immediately limit the child's access to that content without the need to manually specify every piece of music by that artist.

Specifying actions to be taken on the occurrence of particular repeating objects is accomplished in a number of ways. For example, in one embodiment, a handheld remote control, similar to a conventional television remote, or other wireless or wired control device, is provided to the user. A receiver connected to a computing device on which the media stream is being processed receives commands from the remote control and then either acts on those commands, or stores the commands for action upon subsequent instances of particular repeating objects. The remote control may include buttons or controls embodying any or all of the actions noted above, as well as customizable or programmable buttons or controls for allowing user defined actions. In general, remote control devices are well known to those skilled in the art. Consequently, the processes underlying the operation of such remote controls will not be described in detail herein.

In operation, one or more buttons corresponding to particular actions are included on the remote control. Activation of any of the buttons during the playback of any particular media object automatically links the associated command to the current media object, such that subsequent instances of that media object will automatically include the user specified action. This action will then be implemented upon each subsequent occurrence of the media object with the media stream. However, note that in one embodiment, certain actions, such as, for example, a "skip" command may be programmed to operate only at the time the command is activated, rather than being permanently associated with all future instances of a repeating object.

In another embodiment, the functionality offered by the remote control is provided in a computer user interface window. In particular, in this embodiment, a number of on-screen buttons or controls provides the same type of functionality that is described above with respect to the remote control.

In yet another embodiment, voice activation is provided to allow a user to control actions associated with repeating objects in the media stream. In particular, in this embodiment, a number of spoken keywords or phrases are interpreted by the computer using conventional voice or speech recognition techniques. Upon recognition of the spoken command, the action associated with that command is then linked with the current media object, such that subsequent instances of that media object will automatically include the user specified action. This action will then be implemented upon each subsequent occurrence of the media object with the media stream. For example, in one embodiment, where a user speaks the command "Save," the current media object is automatically extracted from the media stream and stored for later use by the user. Similarly, where the user speaks the command "Delete," the current media object is automatically deleted from the currently playing portion of the media stream, and all subsequent occurrences of that media object will also be removed from the media stream without further action by the user.

In still a further embodiment objects are stored and a user can select actions to be associated with them by proceeding through objects in the database successively. For example, all of the objects of length 2 minutes or greater found within a certain time period might be stored, and the user then advances through them, associating actions with any of them he chooses. In this embodiment the user need not listen to or watch the entire object; for example he might be presented with a 10 second representative segment and then make the decision whether to associate any action with the object based on the content of that segment. This embodiment is advantageous in that it serves to greatly speed up the process of associating actions wit objects for the user.

In embodiments where commands such as, for example, "Skip," "Delete," and "Replace" are provided, the media stream is preferably buffered for a sufficient period of time prior to playback to allow for seamless deletions, skipping, or replacement of particular objects embedded within the media stream. For example, when using a buffered playback, and allowing for skipping or deletions, the length of the delay provided by the buffer should be greater than the combined length of all objects skipped or deleted. Note that the buffer length requirement is relaxed where particular media objects are replaced rather than being simply deleted or skipped. For example, if a listener chooses to excise four 3-minute songs per hour of audio, a buffer of at least twelve minutes per hour is needed. On the other hand, if the user elects to substitute material for the songs that are excised, obviously far less buffering would be required.

In addition to the just described benefits, other advantages of the system and method for automatically identifying and segmenting repeating media objects in a media stream will become apparent from the detailed description which follows hereinafter when taken in conjunction with the accompanying drawing figures.

DESCRIPTION OF THE DRAWINGS

The specific features, aspects, and advantages of the media object extractor will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
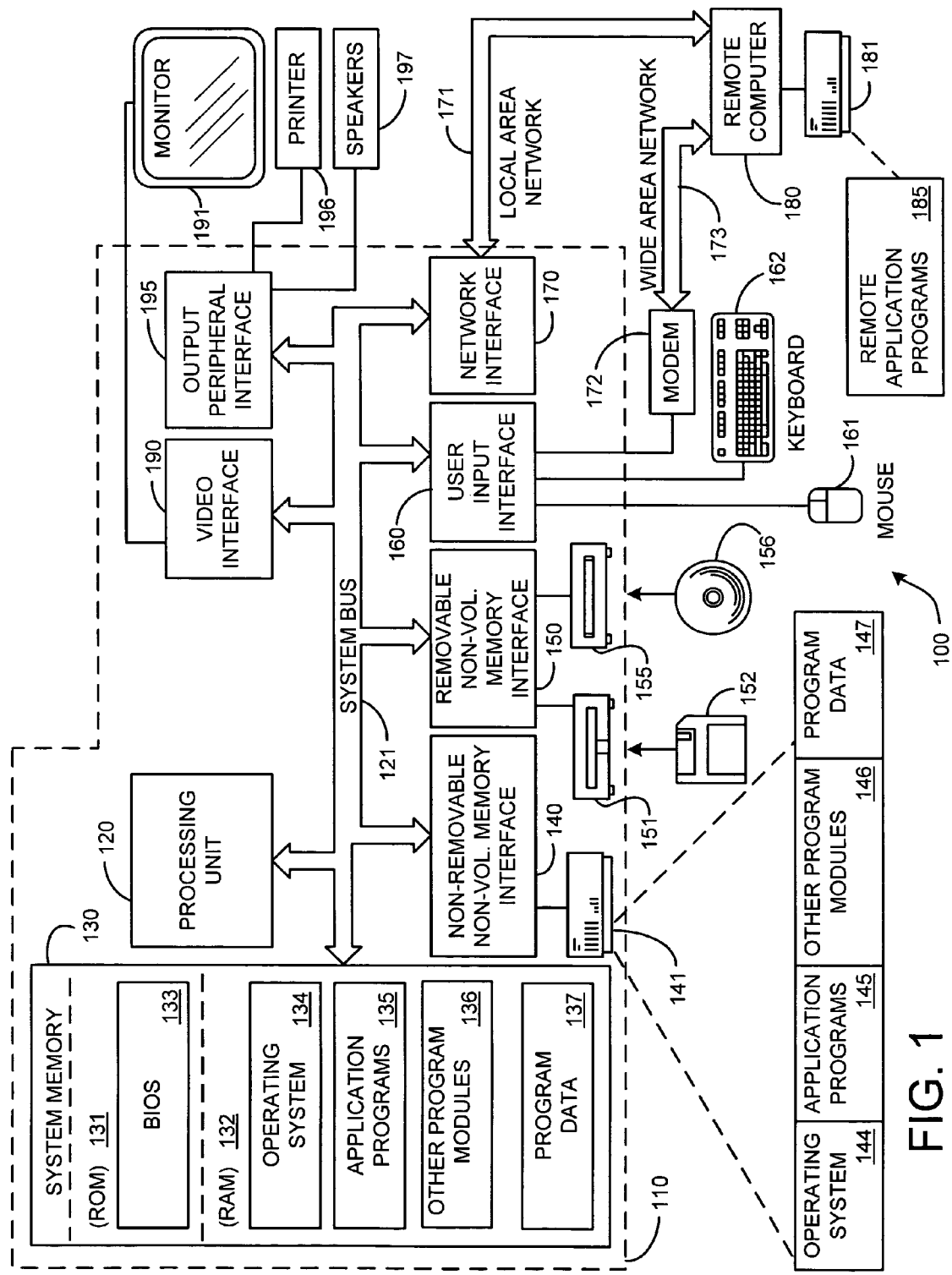
FIG. 1 is a general system diagram depicting a general-purpose computing device constituting an exemplary system for automatically identifying and segmenting repeating media objects in a media stream.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatically identifying and providing user control over repeating media objects in a media stream.

2.0 Introduction:

A "repeating object controller" (ROC), as described herein, operates in cooperation with an "object extractor" or fingerprint engine that identifies repeating objects and their temporal endpoints as they occur within the media stream. In particular, given the identification of repeating objects within the media stream, the ROC then provides an interactive user interface for allowing users to specify how individual repeating objects are to be handled either in real time, or upon subsequent occurrences of the particular repeating objects. Therefore, the system and method described herein can be generally described as including a mechanism for identifying repeating objects along with their temporal endpoints, a user interface for specifying actions to be taken when a particular object repeats within a media stream, and, in one embodiment, a buffer having sufficient length to allow for real-time deletion and/or replacement of particular objects from the media stream without obvious interruption to the stream.

Many media streams contain "objects" that repeat. Repeating objects in a media stream are defined as any section of non-negligible duration, i.e., a song, video, advertisement, jingle, etc., which would be considered to be a logical unit by a human listener or viewer. For example, an audio stream derived from a typical pop radio station will contain, over time, many repetitions of the same objects, including, for example, songs, jingles, advertisements, and station identifiers. Similarly, an audio/video media stream derived from a typical television station will contain, over time, many repetitions of the same objects, including, for example, commercials, advertisements, station identifiers, program "signature tunes", or emergency broadcast signals. However, these objects will typically occur at unpredictable times within the media stream, and are frequently corrupted by noise caused by any acquisition process used to capture or record the media stream.

Further, objects in a typical media stream, such as a radio broadcast, are often corrupted by voice-overs at the beginning and/or end point of each object. Further, such objects are frequently foreshortened, i.e., they are not played completely from the beginning or all the way to the end. Additionally, such objects are often intentionally distorted. For example, audio broadcast via a radio station is often processed using compressors, equalizers, or any of a number of other time/frequency effects. Further, audio objects, such as music or a song, broadcast on a typical radio station is often cross-faded with the preceding and following music or songs, thereby obscuring the audio object start and end points, and adding distortion or noise to the object. Such manipulation of the media stream is well known to those skilled in the art. Finally, it should be noted that any or all of such corruptions or distortions can occur either individually or in combination, and are generally referred to as "noise" in this description, except where they are explicitly referred to individually. Consequently, identification of such objects and locating the endpoints for such objects in such a noisy environment is a challenging problem.

The object extractor described herein successfully addresses these and other issues while providing many advantages. For example, in addition to providing a useful technique for gathering statistical information regarding media objects within a media stream, automatic identification and segmentation of the media stream allows a user to automatically access desired content within the stream, or, conversely, to automatically bypass unwanted content in the media stream. Further advantages include the ability to identify and store only desirable content from a media stream; the ability to identify targeted content for special processing, the ability to de-noise, or clear up any multiply detected objects; and the ability to archive the stream efficiently by storing only single copies of any multiply detected objects.

In general, automatic identification and segmentation of repeating media objects is achieved by comparing portions of the media stream to locate regions or portions within the media stream where media content is being repeated. In a tested embodiment, identification and segmentation of repeating objects is achieved by directly comparing sections of the media stream to identify matching portions of the stream, then aligning the matching portions to identify object endpoints.

In another embodiment, automatic identification and segmentation of repeating media objects is achieved by employing a suite of object dependent algorithms to target different aspects of audio and/or video media for identifying possible objects. Once a possible object is identified within the stream, confirmation of an object as a repeating object is achieved by an automatic search for potentially matching objects in an automatically instantiated dynamic object database, followed by a detailed comparison between the possible object and one or more of the potentially matching objects. Object endpoints are then automatically determined by automatic alignment and comparison to other repeating copies of that object.

In still another embodiment, automatic identification and segmentation of repeating media objects is achieved by first computing audio and/or video fingerprints from segments of the media stream, then searching a fingerprint database to determine whether the current segment is known, e.g., whether it is a "match," as described above. Where the fingerprint database is initially empty, fingerprints are simply computed and used to populate the database. Eventually, when repeating objects appear in the media stream, they will be identified as repeating objects. Such fingerprint computation and comparison and techniques are well known to those skilled in the art, and will not be described in detail herein. As with the previously described embodiments, once a portion of the media stream is determined to match a previously identified segment of the stream, object endpoints are again automatically determined by automatic alignment and comparison to other repeating copies of that object.

In particular, regardless of how a match is identified, e.g., via the aforementioned direct comparison of portions of the media stream, or via the aforementioned fingerprint comparison technique, identification and segmentation of repeating objects is then achieved by aligning the matching portions of the media stream to locate object endpoints. Note that this alignment for endpoint identification, as described below, works well using either the original media stream, or using a low-dimension version of the media stream.

Approximate endpoints are located by first aligning the matching portions using any of a number of conventional techniques, such as simple pattern matching, aligning cross-correlation peaks between the matching portions, or any other conventional technique for aligning matching signals. Once aligned, the endpoints are identified by tracing backwards and forwards in the media stream, past the boundaries of the matching portions, to locate those points where the two portions of the media stream diverge. Because repeating media objects are not typically played in exactly the same order every time they are broadcast, this technique for locating endpoints in the media stream has been observed to satisfactorily locate the start and endpoints of media objects in the media stream.

Once a repeating object and its endpoints have been identified within the media stream, regardless of which of the aforementioned methods are used, the ROC then provides user interaction and control over the media stream with respect to those repeating objects. In particular, the user interface allows the user to specify actions to be taken when a particular repeating object appears in the media stream. Note that the ROC provides for user control of media objects even where the current portion of the media stream represents a media object that has not yet been repeated or identified. For example, where the user specifies an action to be associated with this new and unknown segment of the media stream, that action will be linked to that segment of the media stream, so that when a repeating instance of that segment is eventually identified, the user specified action associated with whatever object is embedded in the segment will be applied as soon as the identification is made.

These user specified actions associated with particular repeating objects are stored in either an object database, along with each object, or in a fingerprint database, along with each fingerprint, depending upon the embodiment that is being used to identify repeating objects within the media stream. As a result, as soon as a particular repeating object is detected within the media stream, the associated action is automatically read from the database and acted upon. Further, in one embodiment, storing the actions in a database provides the added advantage of allowing the user to edit or delete previously specified actions.

2.1 System Overview:

In general, providing for user control of repeating objects involves first identifying repeat instances of objects. In one embodiment, this is accomplished by first instantiating or initializing an empty "object database" for storing information such as, for example, pointers to media object positions within the media stream, parametric information for characterizing those media objects, metadata for describing such objects, object endpoint information, copies of the objects themselves, and user specified actions associated with particular media objects. Note that any or all of this information can be maintained in either a single object database, or in any number of databases or computer files. However, for clarity of discussion, a single database will be referred to throughout this discussion as the aforementioned information.

In an alternate embodiment, a preexisting database including parametric information for characterizing pre-identified objects is used in place of the empty database. However, while such a preexisting database can speed up initial object identifications, over time, it does not provide significantly better performance over an initially empty database that is populated with parametric information as objects are located within the stream.

In either case, once the object database, either empty, or preexisting, is available, the next step involves capturing and storing or buffering at least one media stream over a desired period of time. The desired period of time can be anywhere from minutes to hours, or from days to weeks or longer. Repetition of objects within the stream allows the endpoints of the objects to be identified when the objects are located within the stream. As discussed herein, repetition of objects allows the endpoints of the objects to be identified when the objects are located within the stream. In another embodiment, in order to minimize storage requirements, the stored or buffered media stream is compressed using any desired conventional compression method for compressing audio/and or video content. Such compression techniques are well known to those skilled in the art, and will not be discussed herein.

As noted above, in one embodiment, automatic identification and segmentation of repeating media objects is achieved by comparing portions of the media stream to locate regions or portions within the media stream where media content is being repeated. Specifically, in this embodiment, a portion or window of the media stream is selected from the media stream. The length of the window can be any desired length, but typically should not be so short as to provide little or no useful information, or so long that it potentially encompasses multiple media objects. In a tested embodiment, windows or segments on the order of about two to five times the length of the average repeated object of the sought type was found to produce good results. This portion or window can be selected beginning from either end of the media stream, or can even be randomly selected from the media stream.

Next, the selected portion of the media stream is directly compared against similar sized portions of the media stream in an attempt to locate a matching section of the media stream. These comparisons continue until either the entire media stream has been searched to locate a match, or until a match is actually located, whichever comes first. As with the selection of the portion for comparison to the media stream, the portions which are compared to the selected segment or window can be taken sequentially beginning at either end of the media stream, or can even be randomly taken from the media stream, or when an algorithm indicates the probability that an object of the sought class is present in the current segment.

In this tested embodiment, once a match is identified by the direct comparison of portions of the media stream, identification and segmentation of repeating objects is then achieved by aligning the matching portions to locate object endpoints. Note that because each object includes noise, and may be shortened or cropped, either at the beginning or the end, as noted above, the object endpoints are not always clearly demarcated. However, even in such a noisy environment, approximate endpoints are located by aligning the matching portions using any of a number of conventional techniques, such as simple pattern matching, aligning cross-correlation peaks between the matching portions, or any other conventional technique for aligning matching signals. Once aligned, the actual endpoints are identified by tracing backwards and forwards in the media stream, past the boundaries of the matching portions, to locate those points where the two portions of the media stream diverge. Because repeating media objects are not typically played in exactly the same order every time they are broadcast, this technique for locating endpoints in the media stream has been observed to satisfactorily locate the start and endpoints of media objects in the media stream.

Alternately, as noted above, in one embodiment, a suite of algorithms is used to target different aspects of audio and/or video media for computing parametric information useful for identifying objects in the media stream. This parametric information includes parameters that are useful for identifying particular objects, and thus, the type of parametric information computed is dependent upon the class of object being sought. Note that any of a number of well-known conventional frequency, time, image, or energy-based techniques for comparing the similarity of media objects can be used to identify potential object matches, depending upon the type of media stream being analyzed. For example, with respect to music or songs in an audio stream, these algorithms include, for example, calculating easily computed parameters in the media stream such as beats per minute in a short window, stereo information, energy ratio per channel over short intervals, and frequency content of particular frequency bands; comparing larger segments of media for substantial similarities in their spectrum; storing samples of possible candidate objects; and learning to identify any repeated objects In this embodiment, once the media stream has been acquired, the stored media stream is examined to determine a probability that an object of a sought class, i.e., song, jingle, video, advertisement, etc., is present at a portion of the stream being examined. However, it should be noted that in an alternate embodiment, the media stream is examined in real-time, as it is stored, to determine the probability of the existence of a sought object at the present time within the stream. Note that real-time or post storage media stream examination is handled in substantially the same manner. Once the probability that a sought object exists reaches a predetermined threshold, the position of that probable object within the stream is automatically noted within the aforementioned database. Note that this detection or similarity threshold can be increased or decreased as desired in order to adjust the sensitivity of object detection within the stream.

Given this embodiment, once a probable object has been identified in the stream, parametric information for characterizing the probable object is computed and used in a database query or search to identify potential object matches with previously identified probable objects. The purpose of the database query is simply to determine whether two portions of a stream are approximately the same. In other words, whether the objects located at two different time positions within the stream are approximately the same. Further, because the database is initially empty, the likelihood of identifying potential matches naturally increases over time as more potential objects are identified and added to the database.

In another embodiment an audio fingerprint that is representative of a segment of the stream is calculated and stored to a database at some desired frequency. Fingerprints are also calculated at another frequency, not necessarily the same, and compared to the database for matches. A match between a current fingerprint and one previously stored indicates a probable match of the current segment of audio with the segment corresponding to the fingerprint in the database.

Note that in alternate embodiments, the number of potential matches returned by the database query is limited to a desired maximum in order to reduce system overhead. Further, as noted above, the similarity threshold for comparison of the probable object with objects in the database is adjustable in order to either increase or decrease the likelihood of a potential match as desired. In yet another related embodiment, those objects found to repeat more frequently within a media stream are weighted more heavily so that they are more likely to be identified as a potential match than those objects that repeat less frequently. In still another embodiment, if too many potential matches are returned by the database search, then the similarity threshold is increased so that fewer potential matches are returned.

Once the potential matches to the probable object have been returned, a more detailed comparison between the probable object and one or more of the potential matches is performed in order to more positively identify the probable object. At this point, if the probable object is found to be a repeat of one of the potential matches, it is identified as a repeat object, and its position within the stream is saved to the database. Conversely, if the detailed comparison shows that the probable object is not a repeat of one of the potential matches, it is identified as a new object in the database, and its position within the stream and parametric information is saved to the database as noted above. However, in an alternate embodiment, if the object is not identified as a repeat object, a new database search is made using a lower similarity threshold to identify additional objects for comparison. Again, if the probable object is determined to be a repeat it is identified as such, otherwise, it is added to the database as a new object as described above.

Further, as with the previously discussed embodiment, the endpoints of the various instances of a repeating object are automatically determined. For example if there are N instances of a particular object, not all of them may be of precisely the same length. Consequently, a determination of the endpoints involves aligning the various instances relative to one instance and then tracing backwards and forwards in each of the aligned objects to determine the furthest extent at which each of the instances is still approximately equal to the other instances.

It should be noted that the methods for determining the probability that an object of a sought class is present at a portion of the stream being examined, and for testing whether two portions of the stream are approximately the same both depend heavily on the type of object being sought (e.g., music, speech, advertisements, jingles, station identifications, videos, etc.) while the database and the determination of endpoint locations within the stream are very similar regardless of what kind of object is being sought.

In still further modifications of each of the aforementioned embodiments, the speed of media object identification in a media stream is dramatically increased by restricting searches of previously identified portions of the media stream, or by first querying a database of previously identified media objects prior to searching the media stream. Further, in a related embodiment, the media stream is analyzed in segments corresponding to a period of time sufficient to allow for one or more repeat instances of media objects, followed by a database query then a search of the media stream, if necessary.

Finally, once a repeating object and its endpoints have been identified as described above, the ROC then provides user interaction and control over the media stream with respect to those repeating objects, as described below.

Figure 2:
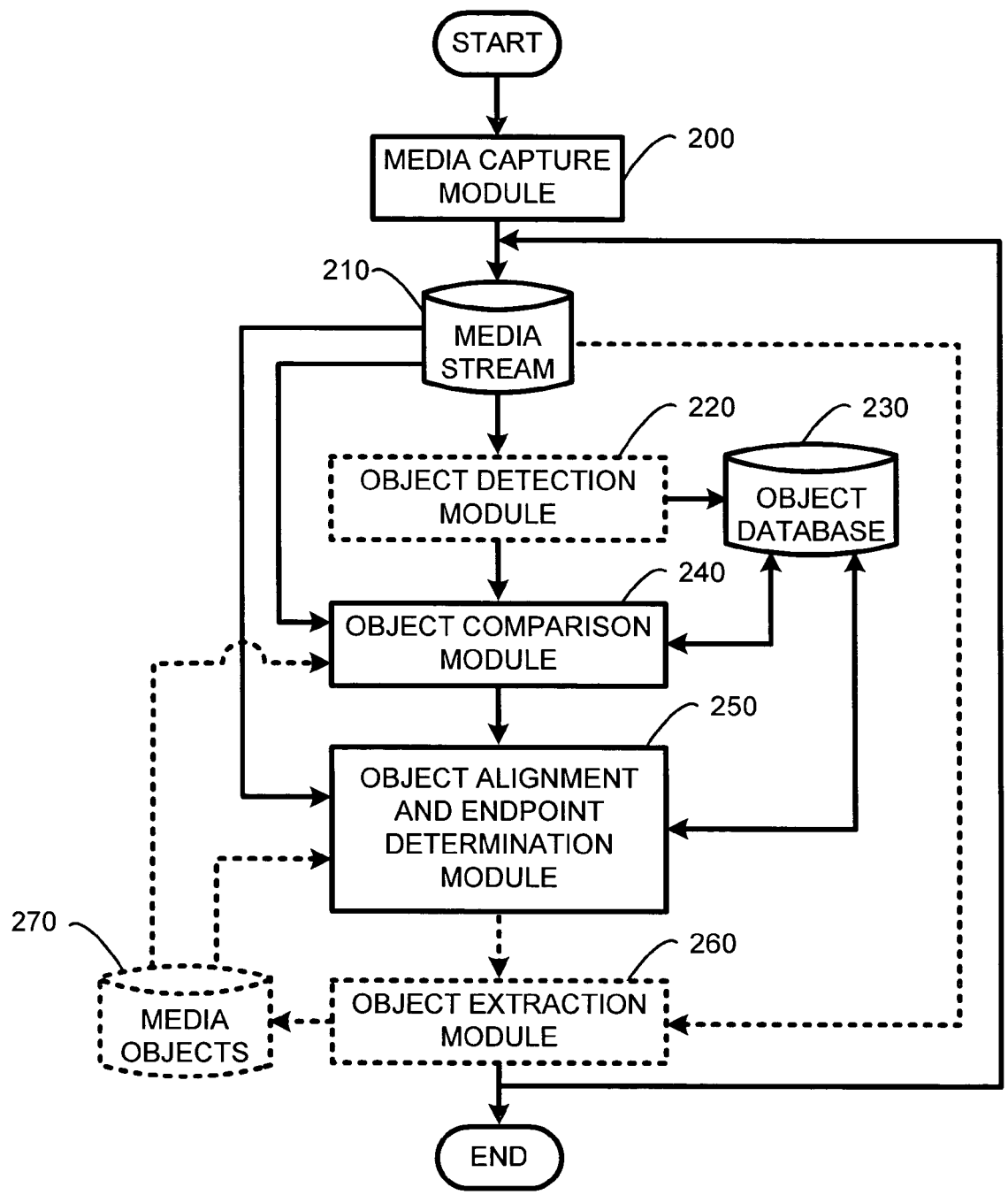
FIG. 2 illustrates an exemplary architectural diagram showing exemplary program modules for automatically identifying and segmenting repeating media objects in a media stream.

2.2 System Architecture:

The following discussion begins with a description of the object extractor, as illustrated by FIG. 2. Next, following a description of several alternate embodiments of an object extractor for identifying repeating objects and their endpoints, a discussion of the ROC is provided with reference to FIG. 3. However, it should be noted that the ROC described herein is not limited to the object extractor described herein. In particular, the ROC is operable with any system that can determine temporal endpoints of repeating objects in a media stream.

2.2.1 Object Extractor System Architecture:

The general system diagram of FIG. 2 illustrates the process summarized above for determining endpoints of repeating objects in a media stream. In particular, the system diagram of FIG. 2 illustrates the interrelationships between program modules for implementing an "object extractor" for automatically identifying and segmenting repeating objects in a media stream. It should be noted that the boxes and interconnections between boxes that are represented by broken or dashed lines in FIG. 2 represent alternate embodiments of the invention, and that any or all of these alternate embodiments, as described below, may be used in combination with other alternate embodiments that are described throughout this document.

In particular, as illustrated by FIG. 2, a system and method for automatically identifying and segmenting repeating objects in a media stream begins by using a media capture module 200 for capturing a media stream containing audio and/or video information. The media capture module 200 uses any of a number conventional techniques to capture a radio or television/video broadcast media stream. Such media capture techniques are well known to those skilled in the art, and will not be described herein. Once captured, the media stream 210 is stored in a computer file or database. Further, in one embodiment, the media stream 210 is compressed using conventional techniques for compression of audio and/or video media.

In one embodiment, an object detection module 220 selects a segment or window from the media stream and provides it to an object comparison module 240 performing a direct comparison between that section and other sections or windows of the media stream 210 in an attempt to locate matching portions of the media stream. As noted above, the comparisons performed by the object comparison module 240 continue until either the entire media stream 210 has been searched to locate a match, or until a match is actually located, whichever comes first. Further, in some cases searching of the stream continues even after a match has been found. This might be the case when, for example, it is desired to find all matches, for the purpose of denoising, or selecting a best copy among the several found.

In this embodiment, once a match is identified by the direct comparison of portions of the media stream by the object comparison module 240, identification and segmentation of repeating objects is then achieved using an object alignment and endpoint determination module 250 to align the matching portions of the media stream and then search backwards and forwards from the center of alignment between the portions of the media stream to identify the furthest extents at which each object is approximately equal. Identifying the extents of each object in this manner serves to identify the object endpoints. In one embodiment, this endpoint information is then stored in the object database 230.

Alternately, in another embodiment, rather than simply selecting a window or segment of the media stream for comparison purposes, the object detection module first examines the media stream 210 in an attempt to identify potential media objects embedded within the media stream. This examination of the media stream 210 is accomplished by examining a window representing a portion of the media stream. As noted above, the examination of the media stream 210 to detect possible objects uses one or more detection algorithms that are tailored to the type of media content being examined. In general, these detection algorithms compute parametric information for characterizing the portion of the media stream being analyzed. Detection of possible media objects is described below in further detail in Section 3.1.1.

Once the object detection module 220 identifies a possible object, the location or position of the possible object within the media stream 210 is noted in an object database 230. In addition, the parametric information for characterizing the possible object computed by object detection module 220 is also stored in the object database 230. Note that this object database is initially empty, and that the first entry in the object database 230 corresponds to the first possible object that is detected by the object detection module 220. Alternately, the object database is pre-populated with results from the analysis or search of a previously captured media stream. The object database is described in further detail below in Section 3.1.3.

Following the detection of a possible object within the media stream 210, an object comparison module 240 then queries the object database 230 to locate potential matches, i.e., repeat instances, for the possible object. Once one or more potential matches have been identified, the object comparison module 240 then performs a detailed comparison between the possible object and one or more of the potentially matching objects. This detailed comparison includes either a direct comparison of portions of the media stream representing the possible object and the potential matches, or a comparison between a lower-dimensional version of the portions of the media stream representing the possible object and the potential matches. This comparison process is described in further detail below in Section 3.1.2.

Next, once the object comparison module 240 has identified a match or a repeat instance of the possible object, the possible object is flagged as a repeating object in the object database 230. An object alignment and endpoint determination module 250 then aligns the newly identified repeat object with each previously identified repeat instance of the object, and searches backwards and forwards among each of these objects to identify the furthest extents at which each object is approximately equal. Identifying the extents of each object in this manner serves to identify the object endpoints. This endpoint information is then stored in the object database 230. Alignment and identification of object endpoints is discussed in further detail below in Section 3.1.4.

Finally, in another embodiment, once the object endpoints have been identified by the object alignment and endpoint determination module 250, an object extraction module 260 uses the endpoint information to copy the section of the media stream corresponding to those endpoints to a separate file or database of individual media objects 270. Note also that in another embodiment, the media objects 270 are used in place of portions of the media stream representing potential matches to the possible objects for the aforementioned comparison between lower-dimensional versions of the possible object and the potential matches.

The processes described above are repeated, with the portion of the media stream 210 that is being analyzed by the object detection module 220 being incremented, such as, for example, by using a sliding window, or by moving the beginning of the window to the computed endpoint of the last detected media object. These processes continue until such time as the entire media stream has been examined, or until a user terminates the examination. In the case of searching a stream in real-time for repeating objects, the search process may be terminated when a pre-determined amount of time has been expended.

Figure 3:
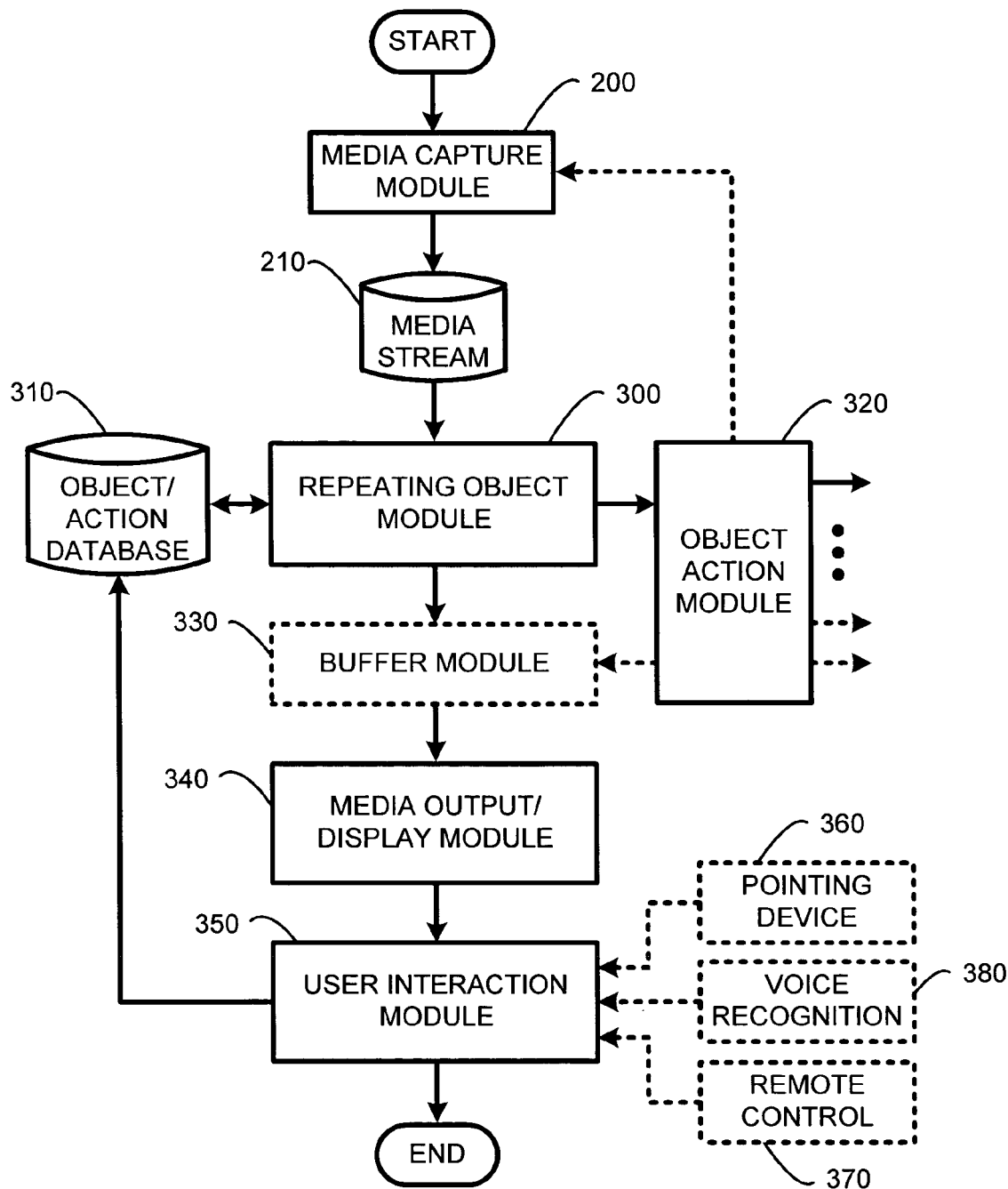
FIG. 3 illustrates an exemplary architectural diagram showing exemplary program modules for providing user control over repeating objects embedded in a media stream.

2.2.2 Repeating Object Controller System Architecture:

Turning now to a discussion of the repeating object controller, i.e., the "ROC," the general system diagram of FIG. 3 illustrates the process summarized above for providing user control and interaction of the media stream with respect to repeating objects embedded within the stream. In particular, the system diagram of FIG. 3 illustrates the interrelationships between program modules for implementing a "repeating object controller" (ROC) for providing an interactive user interface for allowing users to specify how individual repeating objects are to be handled either in real time, or upon subsequent occurrences of the particular repeating objects. It should be noted that the boxes and interconnections between boxes that are represented by broken or dashed lines in FIG. 3 represent alternate embodiments of the invention, and that any or all of these alternate embodiments, as described below, may be used in combination with other alternate embodiments that are described throughout this document.

In particular, as illustrated by FIG. 3, a system and method for providing user control and interaction of the media stream with respect to repeating objects embedded within the stream begins by using the media capture module 200 for capturing a media stream containing audio and/or video information. As noted above, the media capture module 200 uses any of a number conventional techniques to capture a radio or television/video broadcast media stream. Such media capture techniques are well known to those skilled in the art, and will not be described herein. Once captured, the media stream 210 is stored in a computer file or database. As noted above, buffering of the media stream allows for operations such as seamless insertion, deletion, or replacement of objects in the media stream. Further, in one embodiment, the media stream 210 is compressed using conventional techniques for compression of audio and/or video media.

Next, a repeating object module 300 processes the media stream to identify repeating objects within the media stream and the endpoints of those repeating objects. Identification of such repeating objects and their endpoints is accomplished using any of the methods described above, or any other method that is capable of both identifying repeating objects and their endpoints through an analysis of the media stream. Note that such identification can occur in real time, or during playback of a previously stored or buffered copy of the media stream.

Once the repeating object module 300 has identified a repeating object within the media stream, an object/action database 310 is automatically queried to determine whether an action has been assigned to or associated with that particular object. Further, where the analysis of the media stream 210 by the repeating object module 300 indicates that a particular object within the media stream is not a repeating object, either the object, or parameters defining that object are stored in the object/action database 310 for use in identifying subsequent repeating objects. Storing unknown or new objects or the parameters representing such objects for use in subsequent object identification is described in detail above with respect to the repeating object extractor.

If a search of the object/action database 310 indicates that an action is associated with a particular repeating object, then an object action module 320 performs the specified action. As noted above, there are a number of possible actions that can be associated with any particular repeating object. For example, these actions include, but are not limited to:

1. Fast forwarding through the media object;
2. Slowing playback of the media object;
3. Changing the media stream such as by automatically changing a station or channel being monitored;
4. Adding a particular object to a favorites list;
5. Rating a media object;
6. Automatically raising or lowering the volume for particular media objects;
7. Automatically blanking the screen when a particular media object is detected;
8. Skipping to the end of particular media objects within the media stream;
9. Deleting particular media objects from the stream so that they never appear in the media stream playback;
10. Extracting and saving a copy of particular media objects from the media stream;
11. Limiting a particular media object to a maximum number of occurrences during a predefined period;
12. Limiting the frequency with which an object appears relative to another object or objects;

13. Automatically replacing particular media objects in the media stream with another previously stored media object;
14. Automatically jumping from a buffered playback to a real-time playback on the occurrence of particular events, such as, for example, an emergency broadcast signal, or other particular media object. In this case, if the user selects this option, at any time that such a signal is detected within the real-time media stream, the buffered playback will immediately be replaced with a real-time playback of the media stream;
15. Returning to a buffered playback of the media stream from a real-time playback of the media stream; and
16. User defined actions, such as, for example, automatically dimming room lighting upon the occurrence of a particular media object within the media stream.

Methods for implementing such actions are well known to those skilled in the art, and will not be discussed in detail herein. However, while implementation of such methods is known, conventional systems fail to provide the capability to identify repeating objects and their endpoints within the media stream with an interactive user interface for automatically interacting with and controlling those repeating media objects.

Note that in one embodiment the media stream 210 is also at least partially buffered 330. In embodiments where commands such as, for example, "Skip," "Delete," and "Replace" are provided, the media stream is preferably buffered 330 for a sufficient period of time prior to playback to allow for seamless deletions, skipping, or replacement of particular objects embedded within the media stream. For example, when using a buffered 330 playback, and allowing for skipping or deletions, the length of the delay provided by the buffer should be greater than the combined length of all objects skipped or deleted. Note that the buffer length requirement is relaxed where particular media objects are replaced rather than being simply deleted or skipped. For example, if a listener chooses to excise four 3-minute songs per hour of audio, a buffer of at least twelve minutes per hour is needed. On the other hand, if the user elects to substitute material for the songs that are excised, obviously far less buffering would be required.

However, in one embodiment, if the amount of media stream in the buffer ever drops below a predetermined minimum time, one or more previously stored media objects are automatically inserted into the media stream so that the buffer never runs empty. In one embodiment, such inserted objects are chosen randomly, while in another embodiment, the objects to be inserted are chosen based on a rating assigned to the object, with higher rated objects being weighted more heavily when choosing objects for insertion. Note that such ratings can be assigned either via the aforementioned rating command, or can be assigned as a function of number of times that a particular object has been played.

Next, after performing the specified action, if any, for a particular repeating media object, a media output/display module 340 provides playback of the media stream. For example, given an audio media stream, the media output/display module 340 uses conventional speaker devices to provide for an audible playback of the media stream. Similarly, given a video media stream, the media output/display module 340 uses a conventional display device, such as a computer screen or other display monitor to provide a visual playback of the media stream. Finally, given a combined audio/video media stream, the media output/display module 340 will use both speaker device and a display device for simultaneous audio and video playback of the media stream.

During playback of the media stream, a user interaction module 350 provides for real-time user interaction with the media stream for controlling the currently playing media object, or associating control commands, such as those listed above, with subsequent instances of the currently playing media object. For example, if a command is issued for a currently playing media object, if the object is a repeating object, then the endpoints will have already been determined, as described above. Consequently, the command will be acted upon immediately. However, where the currently playing media object represents a first occurrence of the object within the media stream, the endpoints of that object will not have been determined, so the command will be stored in the object/action database 310 for automatic action upon the next occurrence of that particular media object. Note that such commands are issued using conventional methods such as, for example, a pointing device 360, a remote control device 370, or automatic voice recognition of spoken commands.

As noted above, specifying actions to be taken on the occurrence of particular repeating objects is accomplished in a number of ways. For example, in one embodiment, a handheld remote control 370, similar to a conventional television remote, or other wireless or wired control device, is provided to the user. A receiver connected to a computing device on which the media stream is being processed receives commands from the remote control and then either acts on those commands via the object action module 330, or stores the commands in the object/action database 320 for action upon subsequent instances of particular repeating objects. The remote control 370 may include buttons or controls embodying any or all of the actions noted above, as well as customizable or programmable buttons or controls for allowing user defined actions. In general, remote control devices are well known to those skilled in the art. Consequently, the processes underlying the operation of such remote controls will not be described in detail herein.

In operation, one or more buttons corresponding to particular actions are included on the remote control 370. Activation of any of the buttons during the playback of any particular media object automatically links the associated command to the current media object, such that subsequent instances of that media object will automatically include the user specified action. This action will then be implemented upon each subsequent occurrence of the media object with the media stream. However, note that in one embodiment, certain actions, such as, for example, a "skip" command may be programmed to operate only at the time the command is activated, rather than being permanently associated with all future instances of a repeating object.

In another embodiment, the functionality offered by the remote control is provided in a computer user interface window. In particular, in this embodiment, a number of on-screen buttons or controls, selected via a conventional pointing device 360, provides the same type of functionality that is described above with respect to the remote control.

In yet another embodiment, voice activation 380 is provided to allow a user to control actions associated with repeating objects in the media stream. In particular, in this embodiment, a number of spoken keywords or phrases are interpreted by the computer using conventional voice or speech recognition techniques. Upon recognition of the spoken command, the action associated with that command is then linked with the current media object, such that subsequent instances of that media object will automatically include the user specified action. This action will then be implemented upon each subsequent occurrence of the media object with the media stream. For example, in one embodiment, where a user speaks the command "Save," the current media object is automatically extracted from the media stream and stored for later use by the user. Similarly, where the user speaks the command "Delete," the current media object is automatically deleted from the currently playing portion of the media stream, and all subsequent occurrences of that media object will also be removed from the media stream without further action by the user. Clearly, such voice recognition techniques can be programmed to operate on any desired keyword or phrase for initiating a particular command.

Finally, in yet another embodiment the user is presented with a succession of objects that have been found, or representative subsections of those objects, and is given the opportunity to associate an action with them when they subsequently recur.

3.0 Operation Overview:

The above-described program modules are employed in a repeating object controller (ROC) for providing both automatic and real-time control over repeating objects in a media stream. The following sections provide a detailed operational discussion of exemplary methods for implementing the aforementioned program modules with reference to FIG. 4A through FIG. 9. In particular, exemplary methods for implementing alternate embodiments of the aforementioned object extractor are first described in sections 3.1.1 through 3.1.4. Next, exemplary methods for implementing alternate embodiments of the ROC in view of the exemplary methods for identifying repeating objects and their endpoints are described in Section 3.1.5. Next, alternate embodiments of the object extractor are described in Section 3.2 with reference to the flow diagrams of FIG. 4A through 6. Finally, alternate embodiments of the ROC are described in Section 3.2 with reference to the flow diagrams of FIG. 7 through FIG. 9.

3.1 Operational Elements:

As noted above, the ROC requires a process that provides for the identification of repeating objects and their endpoints within a media stream. Given these repeating objects and their endpoints, the ROC allows for automatic user control and interaction with these repeating media objects. Consequently, in describing the operational elements of the ROC, exemplary methods for implementing alternate embodiments of the object extractor will first be described.

A working example of a general method of identifying repeat instances of an object generally includes the following elements:

1. A technique for determining whether two portions of the media stream are approximately the same. In other words, a technique for determining whether media objects located at approximately time position $t_i$ and $t_j$, respectively, within the media stream are approximately the same. See Section 3.1.2 for further details. Note that in a related embodiment, the technique for determining whether two portions of the media stream are approximately the same is preceded by a technique for determining the probability that a media object of a sought class is present at the portion of the media stream being examined. See Section 3.1.1 for further details.
2. An object database for storing information for describing each located instance of particular repeat objects. The object database contains records, such as, for example, pointers to media object positions within the media stream, parametric information for characterizing those media objects, metadata for describing such objects, object endpoint information, or copies of the objects themselves. Again, as noted above, the object database can actually be one or more databases as desired. See Section 3.1.3 for further details.
3. A technique for determining the endpoints of the various instances of any identified repeat objects. In general, this technique first aligns each matching segment or media object and then traces backwards and forwards in time to determine the furthest extent at which each of the instances is still approximately equal to the other instances. These furthest extents generally correspond to the endpoints of the repeating media objects. See Section 3.1.4 for further details.

It should be noted that the technique for determining the probability that a media object of a sought class is present at a portion of the stream being examined, and the technique for determining whether two portions of the media stream are approximately the same, both depend heavily on the type of object being sought (e.g., whether it is music, speech, video, etc.) while the object database and technique for determining the endpoints of the various instances of any identified repeat objects can be quite similar regardless of the type or class of object being sought.

Note that the following discussion makes reference to the detection of music or songs in an audio media stream in order to put the object extractor in context. However, as discussed above, the same generic approach applies described herein applies equally well to other classes of objects such as, for example, speech, videos, image sequences, station jingles, advertisements, etc.

3.1.1 Object Detection Probability:

As noted above, in one embodiment the technique for determining whether two portions of the media stream are approximately the same is preceded by a technique for determining the probability that a media object of a sought class is present at the portion of the media stream being examined. This determination is not necessary in the embodiment where direct comparisons are made between sections of the media stream (see Section 3.1.2); however it can greatly increase the efficiency of the search. That is, sections that are determined unlikely to contain objects of the sought class need not be compared to other sections. Determining the probability that a media object of a sought class is present in a media stream begins by first capturing and examining the media stream. For example, one approach is to continuously calculate a vector of easily computed parameters, i.e., parametric information, while advancing through the target media stream. As noted above, the parametric information needed to characterize particular media object types or classes is completely dependent upon the particular object type or class for which a search is being performed.

It should be noted that the technique for determining the probability that a media object of a sought class is present in a media stream is typically unreliable. In other words, this technique classifies many sections as probable or possible sought objects when they are not, thereby generating useless entries in the object database. Similarly, being inherently unreliable, this technique also fails to classify many actual sought objects as probable or possible objects. However, while more efficient comparison techniques can be used, the combination of the initial probable or possible detection with a later detailed comparison of potential matches for identifying repeat objects serves to rapidly identify locations of most of the sought objects in the stream.

Clearly, virtually any type of parametric information can be used to locate possible objects within the media stream. For example, with respect to commercials or other video or audio segments which repeat frequently in a broadcast video or television stream, possible or probable objects can be located by examining either the audio portion of the stream, the video portion of the stream, or both. In addition, known information about the characteristics of such objects can be used to tailor the initial detection algorithm. For example, television commercials tend to be from 15 to 45 seconds in length, and tend to be grouped in blocks of 3 to 5 minutes. This information can be used in locating commercial or advertising blocks within a video or television stream.

With respect to an audio media stream, for example, where it is desired to search for songs, music, or repeating speech, the parametric information used to locate possible objects within the media stream consists of information such as, for example, beats per minute (BPM) of the media stream calculated over a short window, relative stereo information (e.g. ratio of energy of difference channel to energy of sum channel), and energy occupancy of certain frequency bands averaged over short intervals.

In addition, particular attention is given to the continuity of certain parametric information. For example if the BPM of an audio media stream remains approximately the same over an interval of 30-seconds or longer this can be taken as an indication that a song object probably exists at that location in the stream. A constant BPM for a lesser duration provides a lower probability of object existence at a particular location within the stream. Similarly, the presence of substantial stereo information over an extended period can indicate the likelihood that a song is playing.

There are various ways of computing an approximate BPM. For example, in a working example of the object extractor, the audio stream is filtered and down-sampled to produce a lower dimension version of the original stream. In a tested embodiment, filtering the audio stream to produce a stream that contains only information in the range of 0-220 Hz was found to produce good BPM results. However, it should be appreciated that any frequency range can be examined depending upon what information is to be extracted from the media stream. Once the stream has been filtered and down-sampled, a search is then performed for dominant peaks in the low rate stream using autocorrelation of windows of approximately 10-seconds at a time, with the largest two peaks, BPM1 and BPM2, being retained. Using this technique in the tested embodiment, a determination is made that a sought object (in this case a song) exists if either BPM1 or BPM2 is approximately continuous for one minute or more. Spurious BPM numbers are eliminated using median filtering.

It should be noted that in the preceding discussion, the identification of probable or possible sought objects was accomplished using only a vector of features or parametric information. However, in a further embodiment, information about found objects is used to modify this basic search. For example, going back to the audio stream example, a gap of 4 minutes between a found object and a station jingle would be a very good candidate to add to the database as a probably sought object even if the initial search didn't flag it as such.

3.1.2 Testing Object Similarity:

As discussed above, a determination of whether two portions of the media stream are approximately the same involves a comparison of two or more portions of the media stream, located at two positions within the media stream, i.e., $t_i$ and $t_j$, respectively. Note that in a tested embodiment, the size of the windows or segments to be compared are chosen to be larger than expected media objects within the media stream. Consequently, it is to be expected that only portions of the compared sections of the media stream will actually match, rather than entire segments or windows unless media objects are consistently played in the same order within the media stream.

In one embodiment, this comparison simply involves directly comparing different portions of the media stream to identify any matches in the media stream. Note that due to the presence of noise from any of the aforementioned sources in the media stream it is unlikely that any two repeating or duplicate sections of the media stream will exactly match. However, conventional techniques for comparison of noisy signals for determining whether such signals are duplicates or repeat instances are well known to those skilled in the art, and will not be described in further detail herein. Further, such direct comparisons are applicable to any signal type without the need to first compute parametric information for characterizing the signal or media stream.

In another embodiment, as noted above, this comparison involves first comparing parametric information for portions of the media stream to identify possible or potential matches to a current segment or window of the media stream.

Whether directly comparing portions of the media stream or comparing parametric information, the determination of whether two portions of the media stream are approximately the same is inherently more reliable than the basic detection of possible objects alone (see Section 3.1.1). In other words, this determination has a relatively smaller probability of incorrectly classifying two dissimilar stretches of a media stream as being the same. Consequently, where two instances of records in the database are determined to be similar, or two segments or windows of the media stream are determined to be sufficiently similar, this is taken as confirmation that these records or portions of the media stream indeed represent a repeating object.

This is significant because in the embodiments wherein the media stream is first examined to locate possible objects, the simple detection of a possible object can be unreliable; i.e., entries are made in the database that are regarded as objects, but in fact are not. Thus in examining the contents of the database, those records for which only one copy has been found are only probably sought objects or possible objects (i.e., songs, jingles, advertisements, videos, commercials, etc.), but those for which two or more copies have been found are considered to be sought objects with a higher degree of certainty. Thus the finding of a second copy, and subsequent copies, of an object helps greatly in removing the uncertainty due to the unreliability of simply detecting a possible or probable object within the media stream.

For example, in a tested embodiment using an audio media stream, when comparing parametric information rather than performing direct comparisons, two locations in the audio stream are compared by comparing one or more of their critical bands (also called Bark bands). To test the conjecture that locations $t_i$ and $t_j$ are approximately the same, the Bark spectra is calculated for an interval of two to five times the length of the average object of the sought class centered at each of the locations. This time is chosen simply as a matter of convenience. Next, the cross-correlation of one or more of the bands is calculated, and a search for a peak performed. If the peak is sufficiently strong to indicate that these Bark spectra are substantially the same, it is inferred that the sections of audio from which they were derived are also substantially the same.

Further, in another tested embodiment, performing this cross-correlation test with several Bark spectra bands rather than a single one increases the robustness of the comparison. Specifically, a multi-band cross-correlation comparison allows the object extractor to almost always correctly identify when two locations $t_i$ and $t_j$ represent approximately the same object, while very rarely incorrectly indicating that they are the same. Testing of audio data captured from a broadcast audio stream has shown that the Bark spectra bands that contain signal information in the 700 Hz to 1200 Hz range are particularly robust and reliable for this purpose. However, it should be noted that cross-correlation over other frequency bands can also be successfully used by the object extractor when examining an audio media stream.

Once it has been determined that locations $t_i$ and $t_j$ represent the same object, the difference between the peak positions of the cross-correlations of the Bark spectra bands, and the auto-correlation of one of the bands allows a calculation of the alignment of the separate objects. Thus, an adjusted location $t_j'$ is calculated which corresponds to the same location in a song as does $t_i$. In other words, the comparison and alignment calculations show both that the audio centered at $t_i$ and $t_j$ represent the same object, but that $t_i$ and $t_j'$ represent approximately the same position in that object. That is, for example if $t_i$ was 2 minutes into a 6 minute object, and $t_j$ was 4 minutes into the same object the comparison and alignment of the objects allows a determination of whether the objects are the same object, as well as returning $t_j'$ which represents a location that is 2 minutes into the second instance of the object.

The direct comparison case is similar. For example in the direct comparison case, conventional comparison techniques, such as, for example, performing a cross-correlation between different portions of the media stream is used to identify matching areas of the media stream. As with the previous example, the general idea is simply to determine whether two portions of the media stream at locations $t_i$ and $t_j$, respectively, are approximately the same. Further, the direct comparison case is actually much easier to implement than the previous embodiment, because the direct comparison is not media dependent. For example, as noted above, the parametric information needed for analysis of particular signal or media types is dependent upon the type of signal or media object being characterized. However, with the direct comparison method, these media-dependent characterizations need not be determined for comparison purposes.

3.1.3 Object Database:

As noted above, in alternate embodiments, the object database is used to store information such as, for example, any or all of: pointers to media object positions within the media stream; parametric information for characterizing those media objects; metadata for describing such objects; object endpoint information; copies of the media objects; and pointers to files or other databases where individual media objects are stored. Further, in one embodiment, this object database also stores statistical information regarding repeat instances of objects, once found. Note that the term "database" is used here in a general sense. In particular, in alternate embodiments, the system and method described herein constructs its own database, uses the file-system of an operating system, or uses a commercial database package such as, for example an SQL server or Microsoft® Access. Further, also as noted above, one or more databases are used in alternate embodiments for storing any or all of the aforementioned information.

In a tested embodiment, the object database is initially empty. Entries are stored in the object database when it is determined that a media object of a sought class is present in a media stream (see Section 3.1.1 and Section 3.1.2, for example). Note that in another embodiment, when performing direct comparisons, the object database is queried to locate object matches prior to searching the media stream itself. This embodiment operates on the assumption that once a particular media object has been observed in the media stream, it is more likely that that particular media object will repeat within that media stream. Consequently, first querying the object database to locate matching media objects serves to reduce the overall time and computational expense needed to identify matching media objects. These embodiments are discussed in further detail below.

The database performs two basic functions. First it responds to queries for determining if one or more objects matching, or partially matching, either a media object or a certain set of features or parametric information exist in the object database. In response to this query, the object database returns either a list of the stream names and locations of potentially matching objects, as discussed above, or simply the name and location of matching media objects. In one embodiment, if there is no current entry matching the feature list, the object database creates one and adds the stream name and location as a new probable or possible object.

Note that in one embodiment, when returning possibly matching records, the object database presents the records in the order it determines most probable of match. For example, this probability can be based on parameters such as the previously computed similarity between the possible objects and the potential matches. Alternately, a higher probability of match can be returned for records that have already several copies in the object database, as it is more probable that such records will match than those records that have only one copy in the object database. Starting the aforementioned object comparisons with the most probable object matches reduces computational time while increasing overall system performance because such matches are typically identified with fewer detailed comparisons.

The second basic function of the database involves a determination of the object endpoints. In particular, when attempting to determine object endpoints, the object database returns the stream name and location within those streams of each of the repeat copies or instances of an object so that the objects can be aligned and compared as described in the following section.

3.1.4 Object Endpoint Determination:

Over time, as the media stream is processed, the object database naturally becomes increasingly populated with objects, repeat objects, and approximate object locations within the stream. As noted above, records in the database that contain more than one copy or instance of a possible object are assumed to be sought objects. The number of such records in the database will grow at a rate that depends on the frequency with which sought objects are repeated in the target stream, and on the length of the stream being analyzed. In addition to removing the uncertainty as to whether a record in the database represents a sought object or simply a classification error, finding a second copy of a sought object helps determine the endpoints of the object in the stream.

Specifically, as the database becomes increasingly populated with repeat media objects, it becomes increasingly easier to identify the endpoints of those media objects. In general, a determination of the endpoints of media objects is accomplished by comparison and alignment of the media objects identified within the media stream, followed by a determination of where the various instances of a particular media object diverge. As noted above in Section 3.1.2, while a comparison of the possible objects confirms that the same object is present at different locations in the media stream, this comparison, in itself, does not define the boundaries of those objects. However, these boundaries are determinable by comparing the media stream, or a lower-dimensional version of the media stream at those locations, then aligning those portions of the media stream and tracing backwards and forwards in the media stream to identify points within the media stream where the media stream diverges.

For example, in the case of an audio media stream, with N instances of an object in the database record, there are thus N locations where the object occurs in the audio stream. In general, it has been observed that in a direct comparison of a broadcast audio stream, the waveform data can, in some cases, be too noisy to yield a reliable indication of where the various copies are approximately coincident and where they begin to diverge. Where the stream is too noisy for such direct comparison, comparison of a low-dimensional version, or of particular characteristic information, has been observed to provide satisfactory results. For example, in the case of a noisy audio stream, it has been observed that the comparison of particular frequencies or frequency bands, such as a Bark spectra representation, works well for comparison and alignment purposes.

Specifically, in a tested embodiment for extracting media objects from an audio stream, for each of the N copies of the media object, one or more Bark spectra representations are derived from a window of the audio data relatively longer than the object. As described above, a more reliable comparison is achieved through the use of more than one representative Bark band. Note that in a working example of the object extractor applied to an audio stream, Bark bands representing information in the 700 Hz to 1200 Hz range were found especially robust and useful for comparing audio objects. Clearly, the frequency bands chosen for comparison should be tailored to the type of music, speech, or other audio objects in the audio stream. In one embodiment, filtered versions of the selected bands are used to increase robustness further.

Given this example, so long as the selected Bark spectra are approximately the same for all copies, it is assumed that the underlying audio data is also approximately the same. Conversely, when the selected Bark spectra are sufficiently different for all copies it is assumed that the underlying audio data no longer belongs to the object in question. In this manner the selected Bark spectra is traced backwards and forwards within the stream to determine the locations at which divergence occurs in order to determine the boundaries of the object.

In particular, in one embodiment low dimension versions of objects in the database are computed using the Bark spectra decomposition (also known as critical bands). This decomposition is well known to those skilled in the art. This decomposes the signal into a number of different bands. Since they occupy narrow frequency ranges the individual bands can be sampled at much lower rates than the signal they represent. Therefore, the characteristic information computed for objects in the object database can consist of sampled versions of one or more of these bands. For example, in one embodiment the characteristic information consists of a sampled version of Bark band 7 which is centered at 840 Hz.

In another embodiment determining that a target portion of an audio media stream matches an element in the database is done by calculating the cross-correlation of the low dimension version of the database object with a low dimension version of the target portion of the audio stream. A peak in the cross correlation generally implies that two waveforms are approximately equal for at least a portion of their lengths. As is well known to those skilled in the art, there are various techniques to avoid accepting spurious peaks. For example, if a particular local maximum of the cross-correlation is a candidate peak, we may require that the value at the peak is more than a threshold number of standard deviations higher than the mean in a window of values surrounding (but not necessarily including) the peak.

In yet another embodiment the extents or endpoints of the found object is determined by aligning two or more copies of repeating objects. For example, once a match has been found (by detecting a peak in the cross-correlation) the low dimension version of the target portion of the audio stream and the low dimension version of either another section of the stream or a database entry are aligned. The amount by which they are misaligned is determined by the position of the cross-correlation peak. One of the low dimension versions is then normalized so that their values approximately coincide. That is, if the target portion of an audio stream is S, and the matching portion (either from another section of the stream or a database) is G, and it has been determined from the cross-correlation that G and S match with offset o, then $S(t)$, where t is the temporal position within the audio stream, is compared with $G(t+o)$. However a normalization may be necessary before $S(t)$ is approximately equal to $G(t+o)$. Next the beginning point of the object is determined by finding the smallest $t_b$ such that $S(t)$ is approximately equal to $G(t+o)$ for $t>t_b$. Similarly the endpoint of the object is determined by finding the largest $t_e$ such that $S(t)$ is approximately equal to $G(t+o)$ for $t<t_e$. Once this is done $S(t)$ is approximately equal to $G(t+o)$ for $t_b<t<t_e$ and $t_b$ and $t_e$ can be regarded as the approximate endpoints of the object. In some instances it may be necessary to filter the low dimension versions before determining the endpoints.

In one embodiment, determining that $S(t)$ is approximately equal to $G(t+o)$ for $t>t_b$ is done by a bisection method. A location to is found where $S(t_0)$ and $G(t_0+o)$ are approximately equal, and $t_1$ where $S(t_1)$ and $G(t_1+o)$ are not equal, where $t_1<t_0$. The beginning of the object is then determined by comparing small sections of $S(t)$ and $G(t+o)$ for the various values of t determined by the bisection algorithm. The end of the object is determined by first finding $t_0$ where $S(t_0)$ and $G(t_0+o)$ are approximately equal, and $t_2$ where $S(t_2)$ and $G(t_2+o)$ are not equal, where $t_2>t_0$. Finally, the endpoint of the object is then determined by comparing sections of $S(t)$ and $G(t+o)$ for the various values of t determined by the bisection algorithm.

In still another embodiment, determining that $S(t)$ is approximately equal to $G(t+o)$ for $t>t_b$ is done by finding to where $S(t_0)$ and $G(to+o)$ are approximately equal, and then decreasing t from $t_0$ until $S(t)$ and $G(t+o)$ are no longer approximately equal. Rather than deciding that $S(t)$ and $G(t+o)$ are no longer approximately equal when their absolute difference exceeds some threshold at a single value of t, it is generally more robust to make that decision when their absolute difference has exceeded some threshold for a certain minimum range of values, or where the accumulated absolute difference exceeds some threshold. Similarly the endpoint is determined by increasing t from $t_0$ until $S(t)$ and $G(t+o)$ are no longer approximately equal.

In operation, it was observed that among several instances of an object, such as broadcast audio from a radio or TV station, it is uncommon for all of the objects to be of precisely the same length. For example, in the case of a 6-minute object, it may sometimes be played all the way from the beginning to end, sometimes be shortened at beginning and/or end, and sometimes be corrupted by introductory voiceover or the fade-out or fade-in of the previous or next object.

Given this likely discrepancy in the length of repeat objects, it is necessary to determine the point at which each copy diverges from its companion copies. As noted above, in one embodiment, this is achieved for the audio stream case by comparing the selected Bark bands of each copy against the median of the selected Bark bands of all the copies. Moving backwards in time, if one copy sufficiently diverges from the median for a sufficiently long interval, then it is decided that this instance of the object began there. It is then excluded from the calculation of the median, at which point a search for the next copy to diverge is performed by continuing to move backward in time within the object copies. In this manner, eventually a point is reached where only two copies remain. Similarly, moving forward in time, the points where each of the copies diverges from the median are determined in order to arrive at a point where only two copies remain.

One simple approach to determining the endpoints of an instance of the object is to then simply select among the instances the one for which the difference between the right endpoint and left endpoint are greatest. This can serve as a representative copy of the object. It is necessary to be careful however that one does not include a station jingle which occurs before two different instances of a song as being part of the object. Clearly, more sophisticated algorithms to extract a representative copy from the N found copies can be employed, and the methods described above are for purposes of illustration and explanation only. The best instance identified can then be used as representative of all others.

In a related embodiment once a match between the target segment of the stream and another segment of the stream has been found, and the segmentation has been performed, the search is continued for other instances of the object in the remainder of the stream. In a tested embodiment it proves advantageous to replace the target segment of the stream with a segment that contains all of the segmented objects and is zero elsewhere. This reduces the probability of spurious peaks when seeking matches in remainder portions of the stream. For example, if the segments at $t_i$ and $t_j$ have been determined to match, one or other of the endpoints of the object might lie outside the segments centered at $t_i$ and $t_j$, and those segments might contain data that is not part of the object. It improves the reliability of subsequent match decisions to compare against a segment that contains the entire object and nothing else.

Note that comparison and alignment of media objects other than audio objects such as songs is performed in a very similar manner. Specifically, the media stream is either compared directly, unless too noisy, or a low-dimensional or filtered version of the media stream is compared directly. Those segments of the media stream that are found to match are then aligned for the purpose of endpoint determination as described above.

In further embodiments, various computational efficiency issues are addressed. In particular, in the case of an audio stream, the techniques described above in Sections 3.1.1, 3.1.2, and 3.1.4 all use frequency selective representations of the audio, such as Bark spectra. While it is possible to recalculate this every time, it is more efficient to calculate the frequency representations when the stream is first processed, as described in Section 3.1.1, and to then store a companion stream of the selected Bark bands, either in the object database or elsewhere, to be used later. Since the Bark bands are typically sampled at a far lower rate than the original audio rate, this typically represents a very small amount of storage for a large improvement in efficiency. Similar processing is done in the case of video or image-type media objects embedded in an audio/video-type media stream, such as a television broadcast.

Further, as noted above, in one embodiment, the speed of media object identification in a media stream is dramatically increased by restricting searches of previously identified portions of the media stream. For example if a segment of the stream centered at $t_j$ has, from an earlier part of the search, already been determined to contain one or more objects, then it may be excluded from subsequent examination. For Example, if the search is over segments having a length twice the average sought object length, and two objects have already been located in the segment at $t_j$, then clearly there is no possibility of another object also being located there, and this segment can be excluded from the search.

In another embodiment, the speed of media object identification in a media stream is increased by first querying a database of previously identified media objects prior to searching the media stream. Further, in a related embodiment, the media stream is analyzed in segments corresponding to a period of time sufficient to allow for one or more repeat instances of media objects, followed a database query then a search of the media stream, if necessary. The operation of each of these alternate embodiments is discussed in greater detail in the following sections.

Further, in a related embodiment, the media stream is analyzed by first analyzing a portion of the stream large enough to contain repetition of at least the most common repeating objects in the stream. A database of the objects that repeat on this first portion of the stream is maintained. The remainder portion of the stream is then analyzed, by first determining if segments match any object in the database, and then subsequently checking against the rest of the stream.

3.1.5 Control of Repeating Media Objects

As noted above, control of repeating media objects is accomplished by providing a "repeating object controller" (ROC) that operates in cooperation with an "object extractor". The object extractor first identifies repeating objects and their endpoints as they occur within the media stream. Given the identification of repeating objects within the media stream, the ROC then provides an interactive user interface for allowing users to specify how individual repeating objects are to be handled either in real time, or upon subsequent occurrences of particular repeating objects.

The media stream is preferably buffered prior to playback using a buffer having sufficient length to enable real-time deletion and/or replacement of particular objects within the media stream without obvious interruption in the stream. Commands are entered either during playback of the media stream, at which time, the entered command will be associated with future instances of the currently playing media object. Alternately, given a database of previously identified media objects that includes information such as artist and title information, the user is provided with a user interface for browsing the database and assigning particular commands to particular objects within the database. Then, upon subsequent occurrences of those objects having associated commands during either real-time or buffered playback of the media stream, any associated commands will be automatically executed.

3.2 System Operation:

As noted above, the program modules described in Section 2.0 with reference to FIG. 2 and FIG. 3, and in view of the more detailed description provided in Section 3.1, are employed for automatically identifying repeating objects and their endpoints in a media stream and providing automatic and real-time control over those repeating objects. This process is depicted in the flow diagrams of FIG. 4A through 6 which represent alternate embodiments of the object extractor and FIG. 7 through 9 which represent alternate embodiments of the ROC. It should be noted that the boxes and interconnections between boxes that are represented by broken or dashed lines in FIG. 4A through FIG. 9 represent further alternate embodiments of the object extractor, and that any or all of these alternate embodiments, as described below, may be used in combination.

3.2.1 Basic Operation of the Repeating Object Extractor:

Referring now to FIG. 4A through FIG. 6 in combination with FIG. 2, in one embodiment, the process can be generally described as an object extractor that locates, identifies and segments media objects from a media stream 210. In general, a first portion or segment of the media stream $t_i$ is selected. Next, this segment $t_i$ is sequentially compared to subsequent segments $t_j$ within the media stream until the end of the stream is reached. At that point, a new $t_i$ segment of the media stream subsequent to the prior $t_i$ is selected, and again compared to subsequent segments $t_j$ within the media stream until the end of the stream is reached. These steps repeat until the entire stream is analyzed to locate and identify repeating media objects with the media stream. Further, as discussed below, with respect to FIG. 4A through FIG. 6, there are a number of alternate embodiments for implementing, and accelerating the search for repeating objects within the media stream.

Figure 4A:
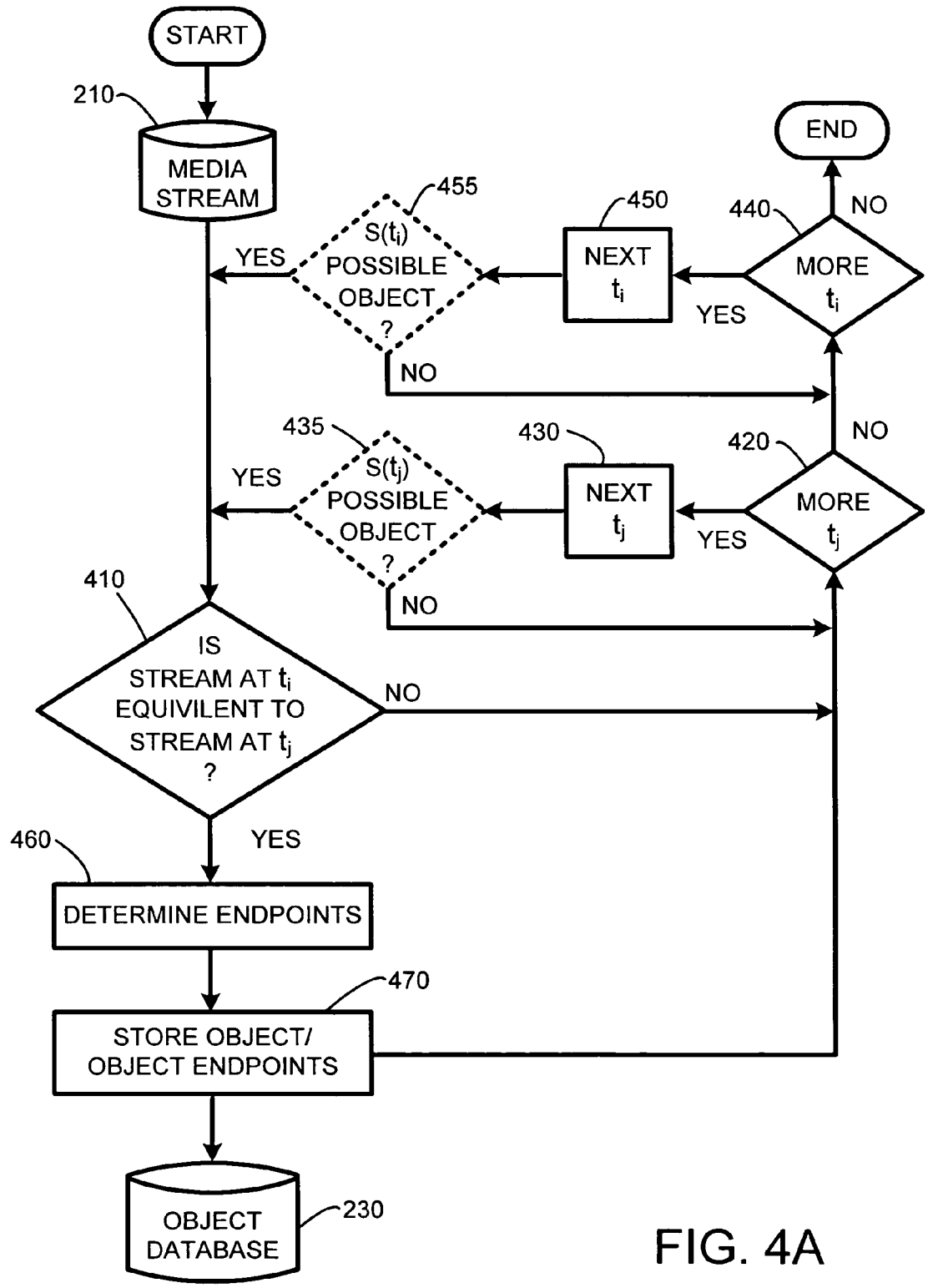
FIG. 4A illustrates an exemplary system flow diagram for automatically identifying and segmenting repeating media objects in a media stream.

In particular, as illustrated by FIG. 4A, a system and method for automatically identifying and segmenting repeating objects in a media stream 210 containing audio and/or video information begins by determining 410 whether segments of the media stream at locations $t_i$ and $t_j$ within the stream represent the same object. As noted above, the segments selected for comparison can be selected beginning at either end of the media stream, or can be selected randomly. However, simply starting at the beginning at the media stream, and selecting an initial segment at time $t_i=t_0$ has been found to be an efficient choice when subsequently selecting segments of the media stream beginning at time $t_j=t_1$ for comparison.

In any event, this determination 410 is made by simply comparing the segments of the media stream at locations $t_i$ and $t_j$. If the two segments, $t_i$ and $t_j$, are determined 410 to represent the same media object, then the endpoints of the objects are automatically determined 460 as described above. Once the endpoints have been found 460, then either the endpoints for the media object located around time $t_i$ and the matching object located around time $t_j$ are stored 470 in the object database 230, or the media objects themselves or pointers to those media objects, are stored in the object database. Again, it should be noted that as discussed above, the size of the segments of the media stream which are to be compared is chosen to be larger than expected media objects within the media stream. Consequently, it is to be expected that only portions of the compared segments of the media stream will actually match, rather than entire segments unless media objects are consistently played in the same order within the media stream.

If it is determined 410 that the two segments of the media stream at locations $t_i$ and $t_j$ do not represent the same media object, then if more unselected segments of the media stream are available 420, then a new or next segment 430 of the media stream at location $t_{j+1}$ is selected as the new $t_j$. This new $t_j$ segment of the media stream is then compared to the existing segment $t_i$ to determine 410 whether two segments represent the same media object as described above. Again, if the segments are determined to 410 to represent the same media object, then the endpoints of the objects are automatically determined 460, and the information is stored 470 to the object database 230 as described above.

Conversely, if it is determined 410 that the two segments of the media stream at locations $t_i$ and $t_j$ do not represent the same media object, and that no more unselected segments of the media stream are available 420 (because the entire media stream has already been selected for comparison to the segment of the media stream represented by $t_i$), then if the end of the media stream has not yet been reached, and more segments $t_i$ are available 440, then a new or next segment 450 of the media stream at location $t_{i+1}$ is selected as the new $t_i$. This new $t_i$ segment of the media stream is then compared to a next segment $t_j$ to determine 410 whether two segments represent the same media object as described above. For example, assuming that the first comparison was made beginning with the segment $t_i$ at time $t_0$ and the segment $t_j$ at time $t_1$, then the second round of comparisons would begin by comparing $t_{i+1}$ at time $t_1$ to $t_{j+1}$ at time $t_2$, then time $t_3$, and so on until the end of the media stream is reached, at which point a new $t_i$ at time $t_2$ is selected. Again, if the segments are determined to 410 to represent the same media object, then the endpoints of the objects are automatically determined 460, and the information is stored 470 to the object database 230 as described above.

In a related embodiment, also illustrated by FIG. 4A, every segment is first examined to determine the probability that it contains an object of the sought type prior to comparing it to other objects in the stream. If the probability is deemed to be higher than a predetermined threshold then the comparisons proceed. If the probability is below the threshold, however, that segment may be skipped in the interests of efficiency.

In particular, in this alternate embodiment, each time that a new $t_j$ or $t_i$ is selected, 430 or 450, respectively, the next step is to determine, 435 or 455, respectively, whether the particular $t_j$ or $t_i$ represents a possible object. As noted above, the procedures for determining whether a particular segment of the media stream represents a possible object include employing a suite of object dependent algorithms to target different aspects of the media stream for identifying possible objects within the media stream. If the particular segment, either $t_j$ or $t_i$, is determined 435 or 455 to represent a possible object, then the aforementioned comparison 410 between r $t_i$ and $t_j$ proceeds as described above. However, in the event that the particular segment, either $t_j$ or $t_i$, is determined 435 or 455 not to represent a possible object, then a new segment is selected 420/430, or 440/450 as described above. This embodiment is advantageous in that it avoids comparisons that are relatively computationally expensive in relative to determining the probability that a media object possibly exists within the current segment of the media stream.

In either embodiment, the steps described above then repeat until every segment of the media stream has been compared against every other subsequent segment of the media stream for purposes of identifying repeating media objects in the media stream.

Figure 4B:
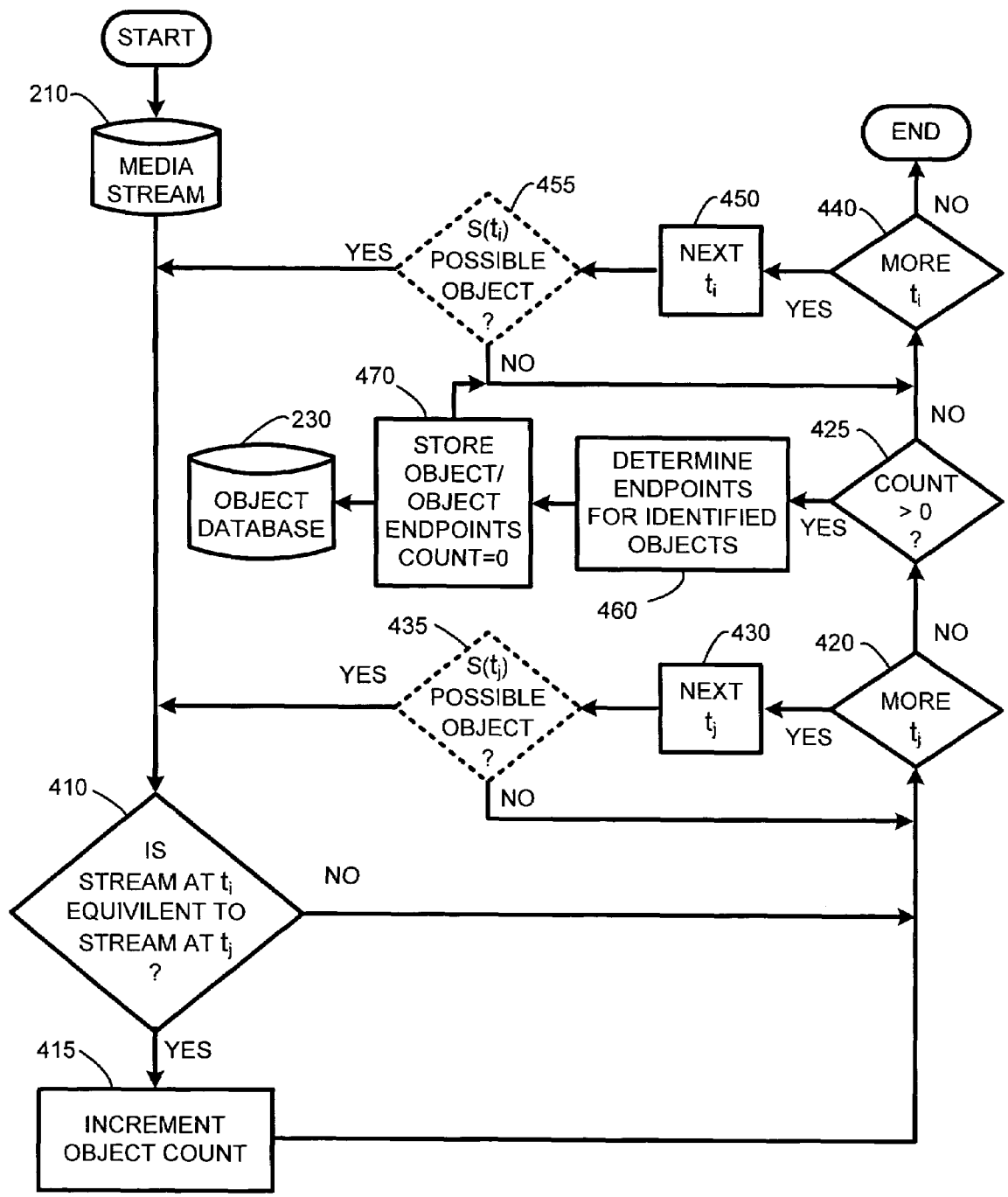
FIG. 4B illustrates an alternate embodiment of the exemplary system flow diagram of FIG. 4A for automatically identifying and segmenting repeating media objects in a media stream.

FIG. 4B illustrates a related embodiment. In general, the embodiments illustrated by FIG. 4B differs from the embodiments illustrated by FIG. 4A in that the determination of endpoints for repeating objects is deferred until each pass through the media stream has been accomplished.

Specifically, as described above, the process operates by sequentially comparing segments $t_i$ of the media stream 210 to subsequent segments $t_j$ within the media stream until the end of the stream is reached. Again, at that point, a new $t_i$ segment of the media stream subsequent to the prior $t_i$ is selected, and again compared to subsequent segments $t_j$ within the media stream until the end of the stream is reached. These steps repeat until the entire stream is analyzed to locate and identify repeating media objects with the media stream.

However, in the embodiments described with respect to FIG. 4A, as soon as the comparison 410 between $t_i$ and $t_j$ indicated a match, the endpoints of the matching objects were determined 460 and stored 470 in the object database 230. In contrast, in the embodiments illustrated by FIG. 4B, an object counter 415 initialized at zero is incremented each time the comparison 410 between $t_i$ and $t_j$ indicates a match. At this point, instead of determining the endpoints for the matching objects, the next $t_j$ is selected for comparison 420/430/435, and again compared to the current $t_i$. This repeats for all $t_j$ segments in the media stream until the entire stream has been analyzed, at which point, if the count of matching objects is greater than zero 425 than the endpoints are determined 460 for all the segments $t_j$ that represent objects matching the current segment $t_i$. Next, either the object endpoints, or the objects themselves are stored 470 in the object database 230 as described above.

At this point, the next segment $t_i$ is selected 440/450/455, as described above, for another round of comparisons 410 to subsequent $t_i$ segments. The steps described above then repeat until every segment of the media stream has been compared against every other subsequent segment of the media stream for purposes of identifying repeating media objects in the media stream.

However, while the embodiments described in this section serve to identify repeating objects in the media stream, a large number of unnecessary comparisons are still made. For example, if a given object has already been identified within the media stream, it is likely that the object will be repeated in the media stream. Consequently, first comparing the current segment $t_i$ to each of the objects in the database before comparing segments $t_i$ and $t_j$ 410 is used in alternate embodiments to reduce or eliminate some of the relatively computationally expensive comparisons needed to completely analyze a particular media stream. Therefore, as discussed in the following section, the database 230 is used for initial comparisons as each segment $t_i$ of the media stream 210 is selected.

Figure 4C:
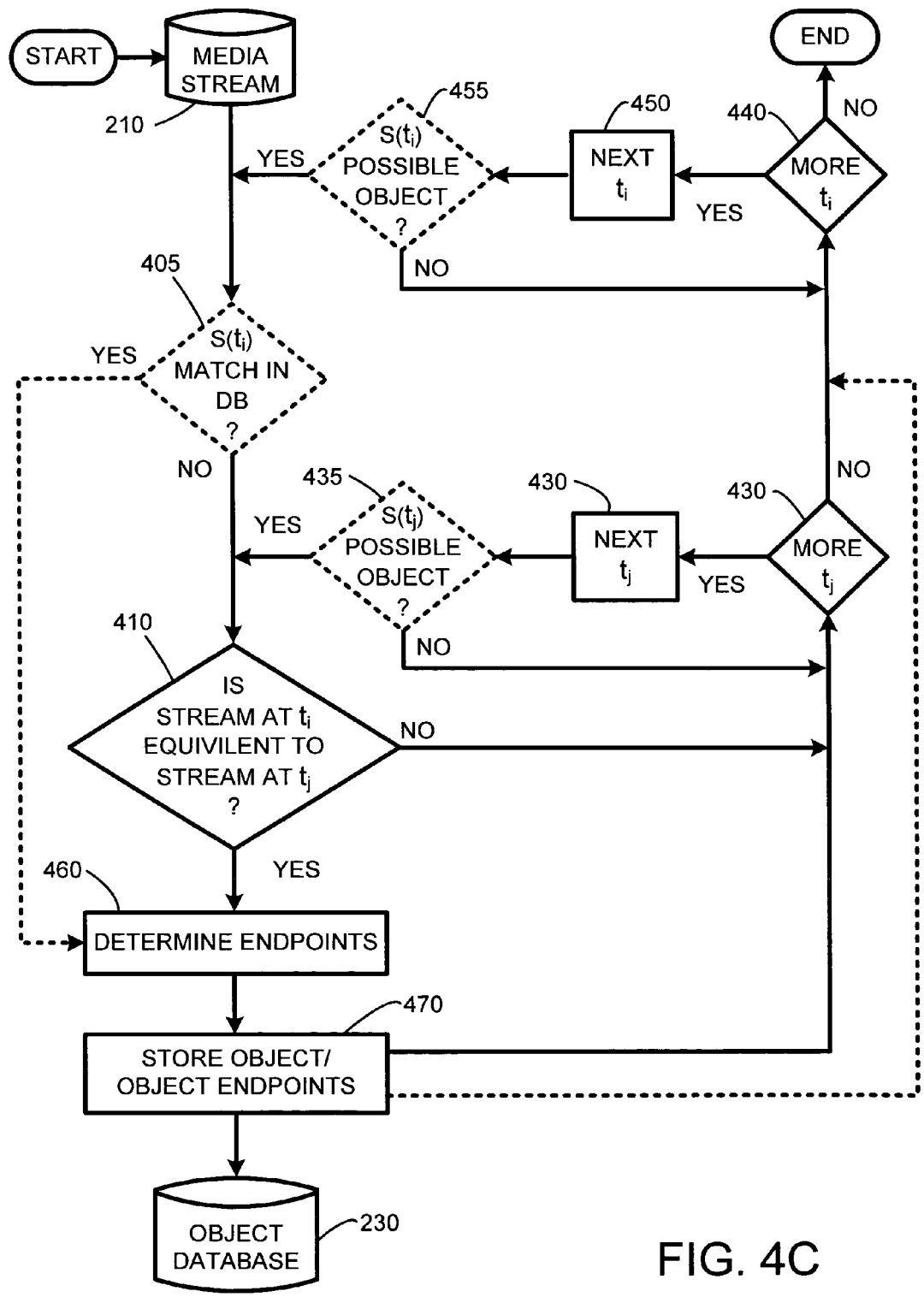
FIG. 4C illustrates an alternate embodiment of the exemplary system flow diagram of FIG. 4A for automatically identifying and segmenting repeating media objects in a media stream.

3.2.2 Operation of the Repeating Object Extractor with Initial Database Comparisons:

In another related embodiment, as illustrated by FIG. 4C, the number of comparisons 410 between segments in the media stream 210 are reduced by first querying a database of previously identified media objects 230. In particular, the embodiments illustrated by FIG. 4C differ from the embodiments illustrated by FIG. 4A in that after each segment $t_i$ of the media stream 210 is selected, it is first compared 405 to the object database 230 to determine whether the current segment matches an object in the database. If a match is identified 405 between the current segment and an object in the database 230, then the endpoints of the object represented by the current segment $t_i$ are determined 460. Next, as described above, either the object endpoints, or the objects themselves, are stored 470 in the object database 230. Consequently, the current segment $t_i$ is identified without an exhaustive search of the media stream by simply querying the object database 230 to locate matching objects.

Next, in one embodiment, if a match was not identified 405 in the object database 230, the process for comparing 410 the current segment $t_i$ to subsequent segments $t_j$ 420/430/435 proceeds as described above until the end of the stream is reached, at which point a new segment $t_i$ is chosen 440/450/455, to begin the process again. Conversely, if a match is identified 405 in the object database 230 for the current segment $t_i$, the endpoints are determined 460 and stored 470 as described above, followed by selection of a new $t_i$ 440/450/455 to begin the process again. These steps are then repeated until all segments $t_i$ in the media stream 210 have been analyzed to determine whether they represent repeating objects.

In further related embodiments, the initial database query 405 is delayed until such time as the database is at least partially populated with identified objects. For example, if a particular media stream is recorded or otherwise captured over a long period, then an initial analysis of a portion of the media stream is performed as described above with respect to FIG. 4A or 4B, followed by the aforementioned embodiment involving the initial database queries. This embodiment works well in an environment where objects repeat frequently in a media stream because the initial population of the database serves to provide a relatively good data set for identifying repeat objects. Note also, that as the database 230 becomes increasing populated, it also becomes more probable that repeating objects embedded within the media stream can be identified by a database query alone, rather than an exhaustive search for matches in the media stream.

In yet another related embodiment, database 230 pre-populated with known objects is used to identify repeating objects within the media stream. This database 230 can be prepared using any of the aforementioned embodiments, or can be imported from or provided by other conventional sources.

However, while the embodiments described in this section have been shown to reduce the number of comparisons performed to completely analyze a particular media stream, a large number of unnecessary comparisons are still made. For example, if a given segment of the media stream at time $t_i$ or $t_j$ has already been identified as belonging to a particular media object, re-comparing the already identified segments to other segments serves no real utility. Consequently, as discussed in the following sections, information relating to which portions of the media stream have already been identified is used to rapidly collapse the search time by restricting the search for matching sections to those sections of the media stream which have not yet been identified.

Figure 5:
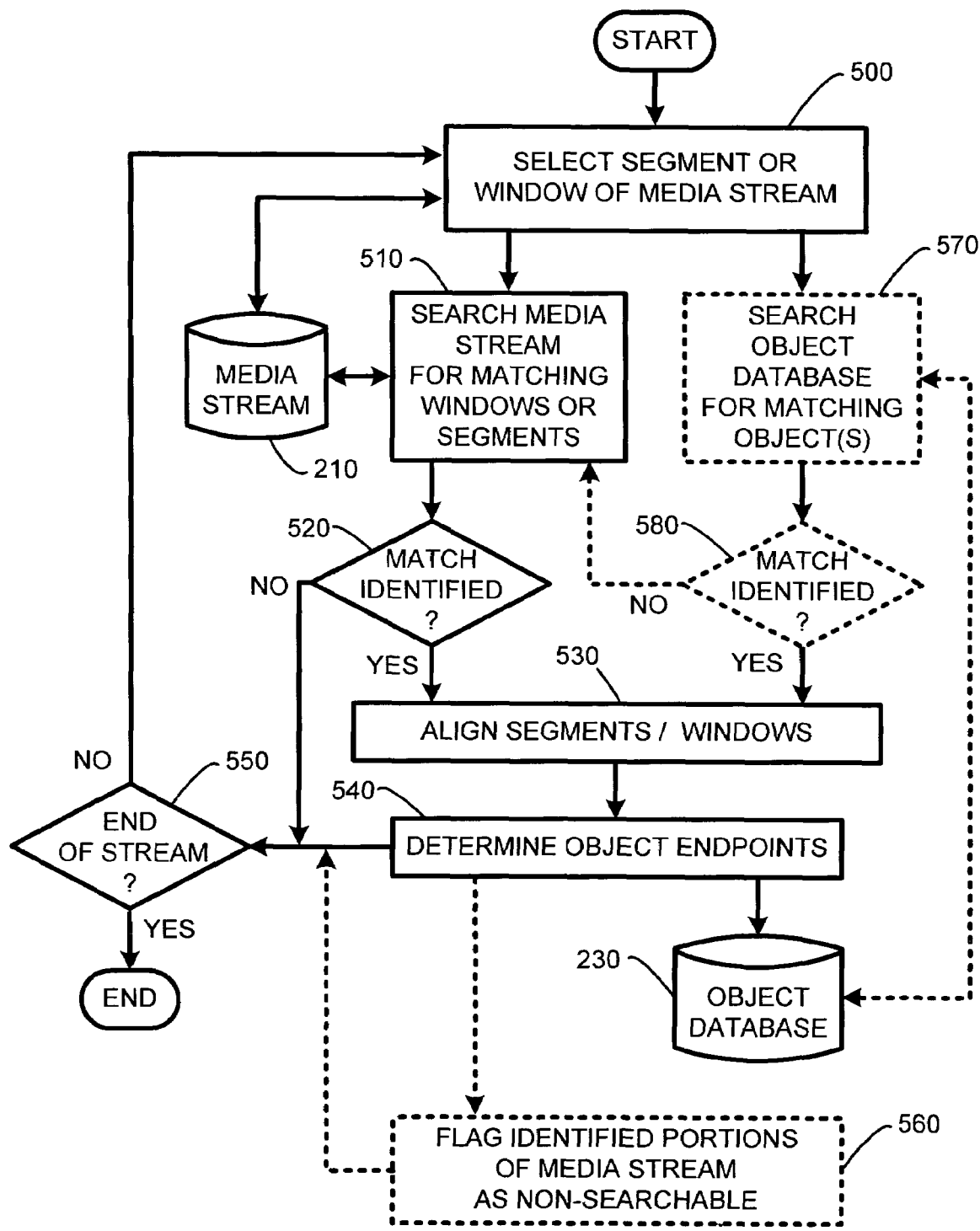
FIG. 5 illustrates an alternate exemplary system flow diagram for automatically identifying and segmenting repeating media objects in a media stream.

3.2.3 Operation of the Repeating Object Extractor with Progressive Stream Search Restrictions:

Referring now to FIG. 5 in combination with FIG. 2, in one embodiment, the process can be generally described as an object extractor that locates, identifies and segments media objects from a media stream while flagging previously identified portions of the media stream so that they are not searched over and over again.

In particular, as illustrated by FIG. 5, a system and method for automatically identifying and segmenting repeating objects in a media stream begins by selecting 500 a first window or segment of a media stream 210 containing audio and/or video information. Next, in one embodiment, the media stream is then searched 510 to identify all windows or segments of the media stream having portions which match a portion of the selected segment or window 500. Note that in a related embodiment, as discussed in further detail below, the media stream is analyzed in segments over a period of time sufficient to allow for one or more repeat instances of media objects rather than searching 510 the entire media stream for matching segments. For example, if a media stream is recorded for a week, then the period of time for the first search of the media stream might be one day. Again, the period of time over which the media stream is searched in this embodiment is simply a period of time which is sufficient to allow for one or more repeat instances of media objects.

In either case, once either all or part of the media stream has been searched 510 to identify all portions of the media stream which match 520 a portion of the selected window or segment 500 then the matching portions are aligned 530, with this alignment then being used to determine object endpoints 540 as described above. Once the endpoints have been determined 540, then either the endpoints for the matching media objects are stored in the object database 230, or the media objects themselves or pointers to those media objects, are stored in the object database.

Further, in one embodiment, those portions of the media stream which have already been identified are flagged and restricted from being searched again 560. This particular embodiment serves to rapidly collapse the available search area of the media stream as repeat objects are identified. Again, it should be noted that as discussed above, the size of the segments of the media stream which are to be compared is chosen to be larger than expected media objects within the media stream. Consequently, it is to be expected that only portions of the compared segments of the media stream will actually match, rather than entire segments unless media objects are consistently played in the same order within the media stream.

Therefore, in one embodiment, only those portions of each segment of the media stream which have actually been identified are flagged 560. However, in a media stream where media objects are found to frequently repeat, it has been observed that simply restricting the entire segment from further searches still allows for the identification of the majority of repeating objects within the media stream. In another related embodiment, where only negligible portions of a particular segment are left unidentified, those negligible portions are simply ignored. In still another related embodiment, partial segments left after restricting portions of the segment from further searching 560 are simply combined with either prior or subsequent segments for purposes of comparisons to newly selected segments 500. Each of these embodiments serves to improve overall system performance by making the search for matches within the media stream more efficient.

Once the object endpoints have been determined 540, when no matches have been identified 520, or after portions of the media stream have been flagged to prevent further searches of those portions 560, a check is made to see if the currently selected segment 500 of the media stream represents the end of the media stream 550. If the currently selected segment 500 of the media stream does represent the end of the media stream 550, then the process is complete and the search is terminated. However, if the end of the media stream has not been reached 550, then a next segment of the media stream is selected, and compared to the remainder of the media stream by searching through the media stream 510 to locate matching segments. The steps described above for identifying matches 520, aligning matching segments 530, determining endpoints 540, and storing the endpoint or object information in the object database 230 are then repeated as described above until the end of the media stream has been reached.

Note that there is no need to search backwards in the media stream, as the previously selected segment has already been compared to the currently selected segment. Further, in the embodiment where particular segments or portions of the media stream have been flagged as identified 560, these segments are skipped in the search 510. As noted above, as more media objects are identified in the stream, skipping identified portions of the media stream serves to rapidly collapse the available search space, thereby dramatically increasing system efficiency in comparison to the basic brute force approach described in Section 3.2.1.

In another embodiment, the speed and efficiency of identifying repeat objects in the media stream is further increased by first searching 570 the object database 230 to identify matching objects. In particular, in this embodiment, once a segment of the media stream has been selected 500, this segment is first compared to previously identified segments based on the theory that once a media object has been observed to repeat in a media stream, it is more likely to repeat again in that media stream. If a match is identified 580 in the object database 230, then the steps described above for aligning matching segments 530, determining endpoints 540, and storing the endpoint or object information in the object database 230 are then repeated as described above until the end of the media stream has been reached.

Each of the aforementioned searching embodiments (e.g., 510, 570, and 560) are further improved when combined with the embodiment wherein the media stream is analyzed in segments over a period of time sufficient to allow for one or more repeat instances of media objects rather than searching 510 the entire media stream for matching segments. For example, if a media stream is recorded for a week, than the period of time for the first search of the media stream might be one day. Thus, in this embodiment, the media stream is first searched 510 over the first time period, i.e., a first day from a week long media recording, with the endpoints of matching media objects, or the objects themselves being stored in the object database 230 as described above. Subsequent searches through the remainder of the media stream, or subsequent stretches of the media stream (i.e., a second or subsequent day of the week long recording of the media stream), are then first directed to the object database (570 and 230) to identify matches as described above.

Figure 6:
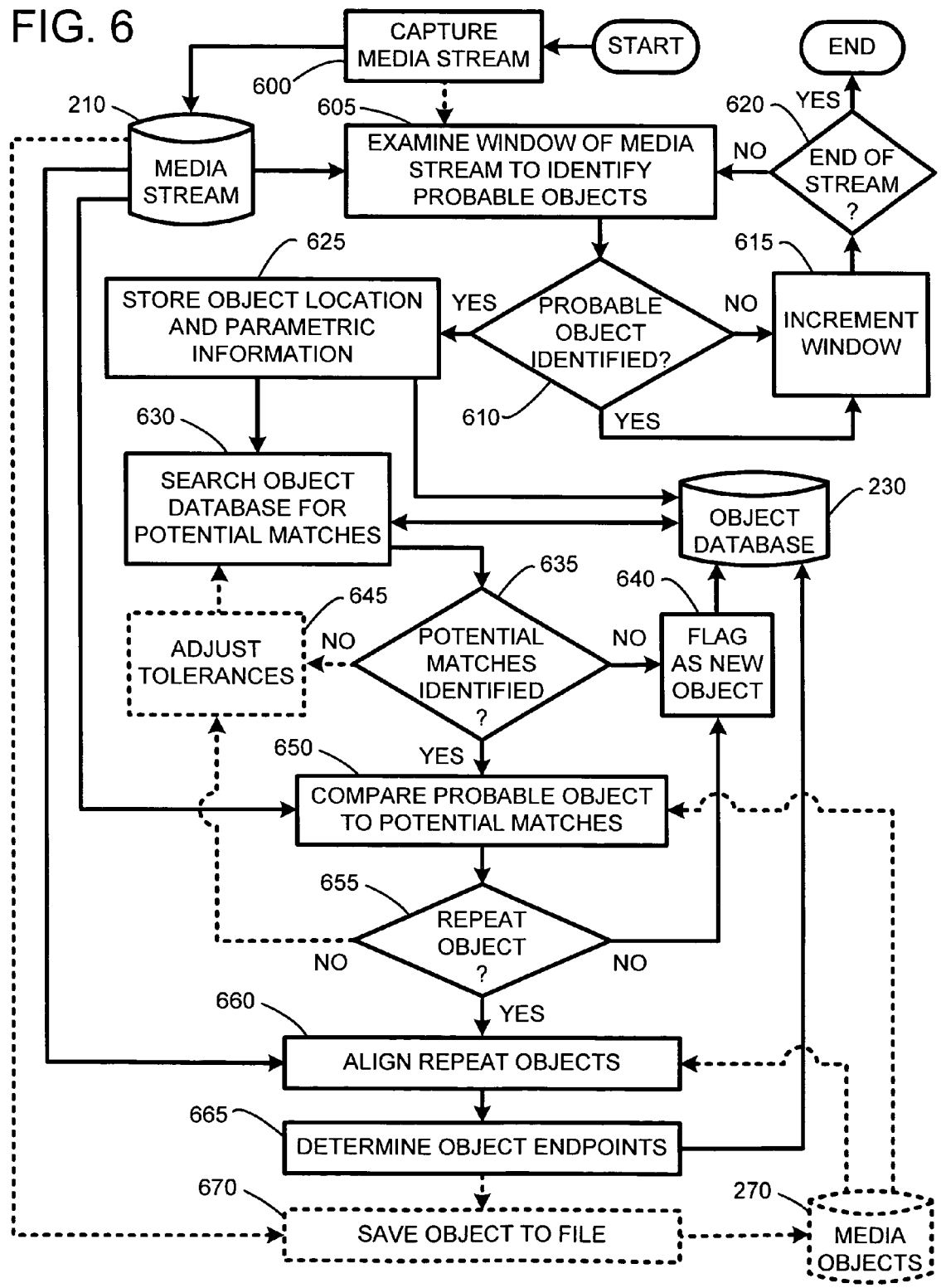
FIG. 6 illustrates an alternate exemplary system flow diagram for automatically identifying and segmenting repeating media objects in a media stream.

3.2.4 Operation of the Repeating Object Extractor with Initial Detection of Probable Objects:

Referring now to FIG. 6 in combination with FIG. 2, in one embodiment, the process can be generally described as an object extractor that locates, identifies and segments media objects from a media stream by first identifying probable or possible objects in the media stream. In particular, as illustrated by FIG. 6, a system and method for automatically identifying and segmenting repeating objects in a media stream begins by capturing 600 a media stream 210 containing audio and/or video information. The media stream 210 is captured using any of a number of conventional techniques, such as, for example, an audio or video capture device connected to a computer for capturing a radio or television/video broadcast media stream. Such media capture techniques are well known to those skilled in the art, and will not described herein. Once captured, the media stream 210 is stored in a computer file or database. In one embodiment, the media stream 210 is compressed using conventional techniques for compression of audio and/or video media.

The media stream 210 is then examined in an attempt to identify possible or probable media objects embedded within the media stream. This examination of the media stream 210 is accomplished by examining a window 605 representing a portion of the media stream. As noted above, the examination of the media stream 210 to detect possible objects uses one or more detection algorithms that are tailored to the type of media content being examined. In general, as discussed in detail above, these detection algorithms compute parametric information for characterizing the portion of the media stream being analyzed. In an alternate embodiment, the media stream is examined 605 in real time as it is captured 600 and stored 210.

If a possible object is not identified in the current window or portion of the media stream 210 being analyzed, then the window is incremented 615 to examine a next section of the media stream in an attempt to identify a possible object. If a possible or probable object is identified 610, then the location or position of the possible object within the media stream 210 is stored 625 in the object database 230. In addition, the parametric information for characterizing the possible object is also stored 625 in the object database 230. Note that as discussed above, this object database 230 is initially empty, and the first entry in the object database corresponds to the first possible object that is detected in the media stream 210. Alternately, the object database 230 is pre-populated with results from the analysis or search of a previously captured media stream. Incrementing of the window 615 examination of the window 605 continues until the end of the media stream is reached 620.

Following the detection of a possible object within the media stream 210, the object database 230 is searched 630 to identify potential matches, i.e., repeat instances, for the possible object. In general, this database query is done using the parametric information for characterizing the possible object. Note that exact matches are not required, or even expected, in order to identify potential matches. In fact, a similarity threshold for performing this initial search for potential matches is used. This similarity threshold, or "detection threshold, can be set to be any desired percentage match between one or more features of the parametric information for characterizing the possible object and the potential matches.

If no potential matches are identified, 635, then the possible object is flagged as a new object 640 in the object database 230. Alternately, in another embodiment, if either no potential matches, or too few potential matches are identified 635, then the detection threshold is lowered 645 in order to increase the number of potential matches identified by the database search 630. Conversely, in still another embodiment, if too many potential matches are identified 635, then the detection threshold is raised so as to limit the number of comparisons performed.

Once one or more potential matches have been identified 635, a detailed comparison 650 between the possible object one or more of the potentially matching objects is performed. This detailed comparison includes either a direct comparison of portions of the media stream 210 representing the possible object and the potential matches, or a comparison between a lower-dimensional version of the portions of the media stream representing the possible object and the potential matches. Note that while this comparison makes use of the stored media stream, the comparison can also be done using previously located and stored media objects 270.

If the detailed comparison 650 fails to locate an object match 655, the possible object is flagged as a new object 640 in the object database 230. Alternately, in another embodiment, if no object match is identified 655, then the detection threshold is lowered 645, and a new database search 630 is performed to identify additional potential matches. Again, any potential matches are compared 650 to the possible object to determine whether the possible object matches any object already in the object database 230.

Once the detailed comparison has identified a match or a repeat instance of the possible object, the possible object is flagged as a repeating object in the object database 230. Each repeating object is then aligned 660 with each previously identified repeat instance of the object. As discussed in detail above, the object endpoints are then determined 665 by searching backwards and forwards among each of the repeating object instances to identify the furthest extents at which each object is approximately equal. Identifying the extents of each object in this manner serves to identify the object endpoints. This media object endpoint information is then stored in the object database 230.

Finally, in still another embodiment, once the object endpoints have been identified 665, the endpoint information is used to copy or save 670 the section of the media stream corresponding to those endpoints to a separate file or database of individual media objects 270.

As noted above, the aforementioned processes are repeated, while the portion of the media stream 210 that is being examined is continuously incremented until such time as the entire media stream has been examined 620, or until a user terminates the examination.

Figure 7:
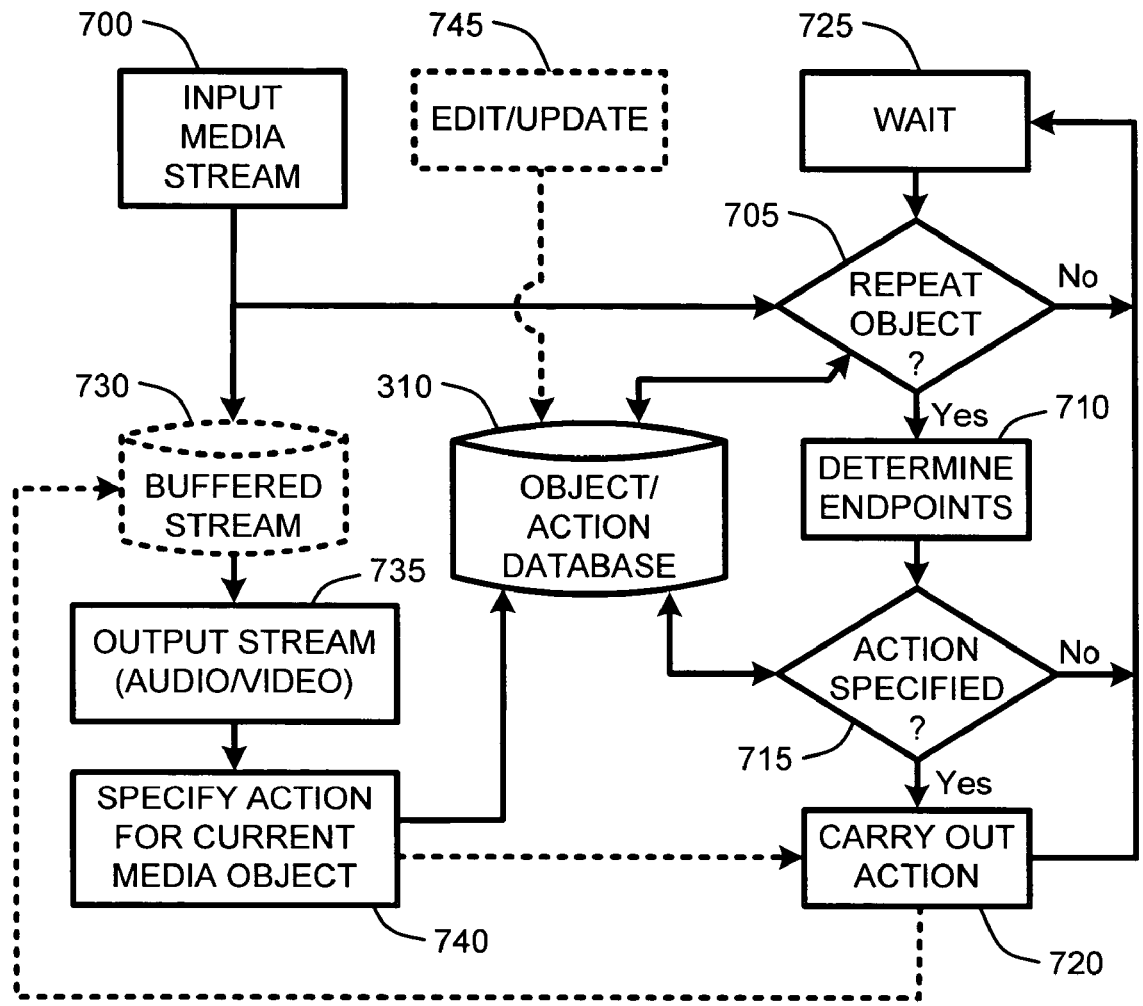
FIG. 7 illustrates an alternate exemplary system flow diagram for providing user control over repeating objects embedded in a media stream.

3.2.5 Operation of the ROC:

Referring now to FIG. 7 in combination with FIG. 3, in one embodiment, the process can be generally described as media controller which provides interactive user control over repeating objects in a media stream. In particular, as illustrated by FIG. 7, a system and method for providing both automatic and real-time user control over repeating audio and/or video objects identified within one or more media streams begins by inputting a media stream 700 containing audio and/or video information. This media stream is preferably buffered 730 prior to output 735 or playback of the media stream to allow for perceptually seamless deletion, insertion, or replacement of particular objects within the media stream.

Prior to buffered playback 735, the media stream is analyzed and compared to one or more entries in the object/action database 310 to determine whether a current segment or portion of the media stream represents a repeat object 705. If the current portion of the media stream does not represent a repeating object, then information for characterizing that portion of the media stream is entered into the object/action database 310 and the system then waits 725 for a next portion of the media stream to again make a determination of whether that portion represents a repeat media object 705. If the current portion of the media stream does represent a repeat object then the endpoints of the object are determined 710. Next, given the endpoints of the object, the object/action database 310 is queried to determine whether an action is specified 715 or associated with that object.

Figure 9:
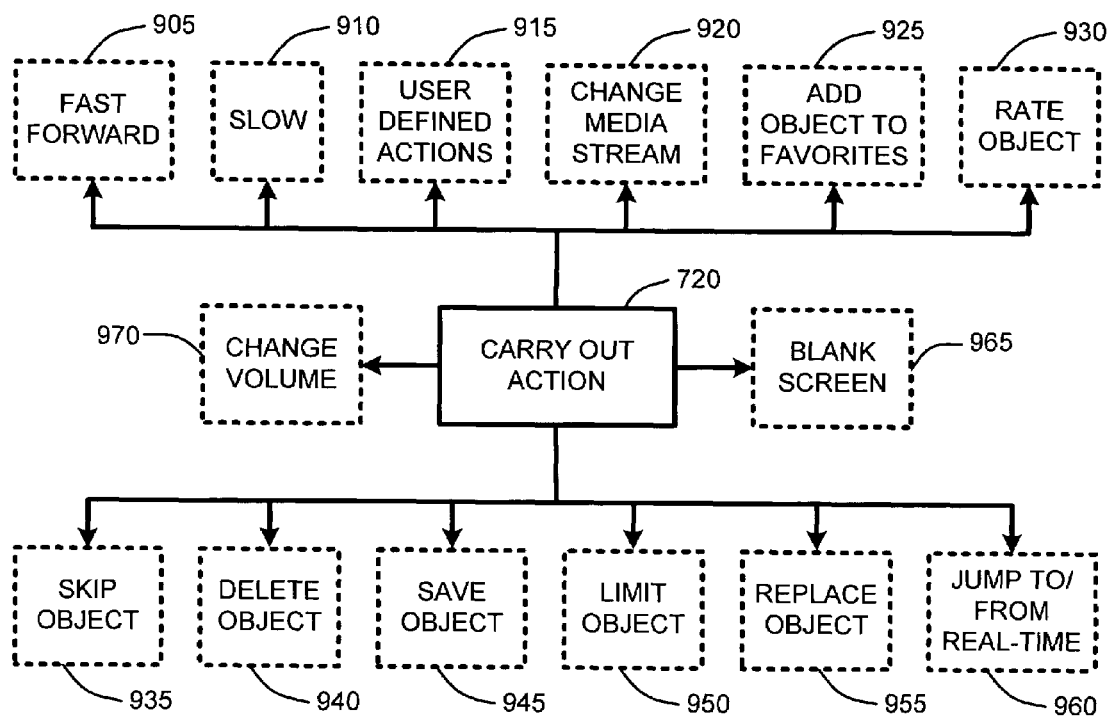
FIG. 9 illustrates an exemplary action control options for providing user control over repeating objects embedded in a media stream.

FIG. 9 provides an example of a non-exclusive list of exemplary actions that may be associated with repeating media objects. In particular, as illustrated by FIG. 9, commands that may be specified by the user include any or all of: fast forward 905; slow 910; user defined actions 915; change media stream 920; add object to favorites 925; rate object 930; skip object 935; delete object 940; save object 945; limit object 950; replace object 955, jump to/from real-time 960; blank screen 965; and change volume 970.

If no action is specified 715 or associated with the current repeat media object, then system then waits 725 for a next portion of the media stream to again make a determination of whether that portion represents a repeat media object 705. However, if an action is specified 715 or associated with the current portion of the media stream, then that action is carried out as described above. Once the specified action is carried out, the system again waits 725 for a next portion of the media stream to again make a determination of whether that portion represents a repeat media object 705.

Note that while the determination of repeating objects 705 is being made, along with a check of the object/action database for associated actions, the media stream is also being output 735. Also, while not necessary, for optimal performance, it is preferred that the media stream is buffered 730 prior to output 735 or playback so that changes can be made to the buffered media stream, in accordance with any actions that are associated with particular repeat media objects. For example, given the identification of a repeating media object and it's temporal endpoints within the media stream, it is a simple matter to delete, replace, or even insert other content into the buffered media stream 730 prior to output 735 or playback of that media stream. Further, where the stream is buffered 730, such deletion, replacement, or insertion of objects in the media stream can be accomplished using conventional techniques without visible and/or audible interruption of the media stream.

Next, during output 735 or playback of the media stream, the user can specify an action 740 for the current object, via a graphical user interface, remote control, voice command, or any combination of such input types. The specified command is then entered into the object/action database. Further, if the action or command entered for the currently playing media object is for a previously identified repeating object, then the endpoints will have already been determined, as described above. Consequently, the command will generally be acted upon immediately, regardless of how far into the media object playback has progressed. However, where the currently playing media object represents a first occurrence of the object within the media stream, the endpoints of that object will not have been determined, so the command will be stored in the object/action database 310 for automatic action upon the next occurrence of that particular media object. It should be noted that in certain cases, repeating instances of various objects can vary in length each time they recur. In this case it may be preferable to recalculate the endpoints for each new instance of the object that occurs.

Finally, in one embodiment, the object/action database 310 is updated or edited 745 via a conventional user interface. In this embodiment, the user s provided with the capability to browse the database and view particular commands associated with particular media objects. The user can then edit, add, or update commands as desired. Further, in a related embodiment, the user is provided with the capability to import data from another object/action database. For example, is the user has trained an object/action database 310 on one computing device, the user can simply save that database to a computer readable medium and transfer the database to any of a number of additional computing devices. In this manner, users are provided with the capability to share trained databases without the need to program the object/action database 310 themselves.

Further, in this embodiment the imported data includes the fingerprints necessary to identify objects, and the actions, if any, to be associated with them. In addition, in one embodiment, this imported data also includes low dimension versions of the media objects represented by the fingerprints. Consequently, given these low dimension versions, identification of object endpoints, and implementation of any specified actions, is then accomplished immediately upon the first instance each particular media object as soon as each object occurs in the media stream. Otherwise, if the low dimension versions are not provided with the imported data, then identification of the object endpoints will require that at least a second instance of that object be observed in the user's local media stream.

Figure 8:
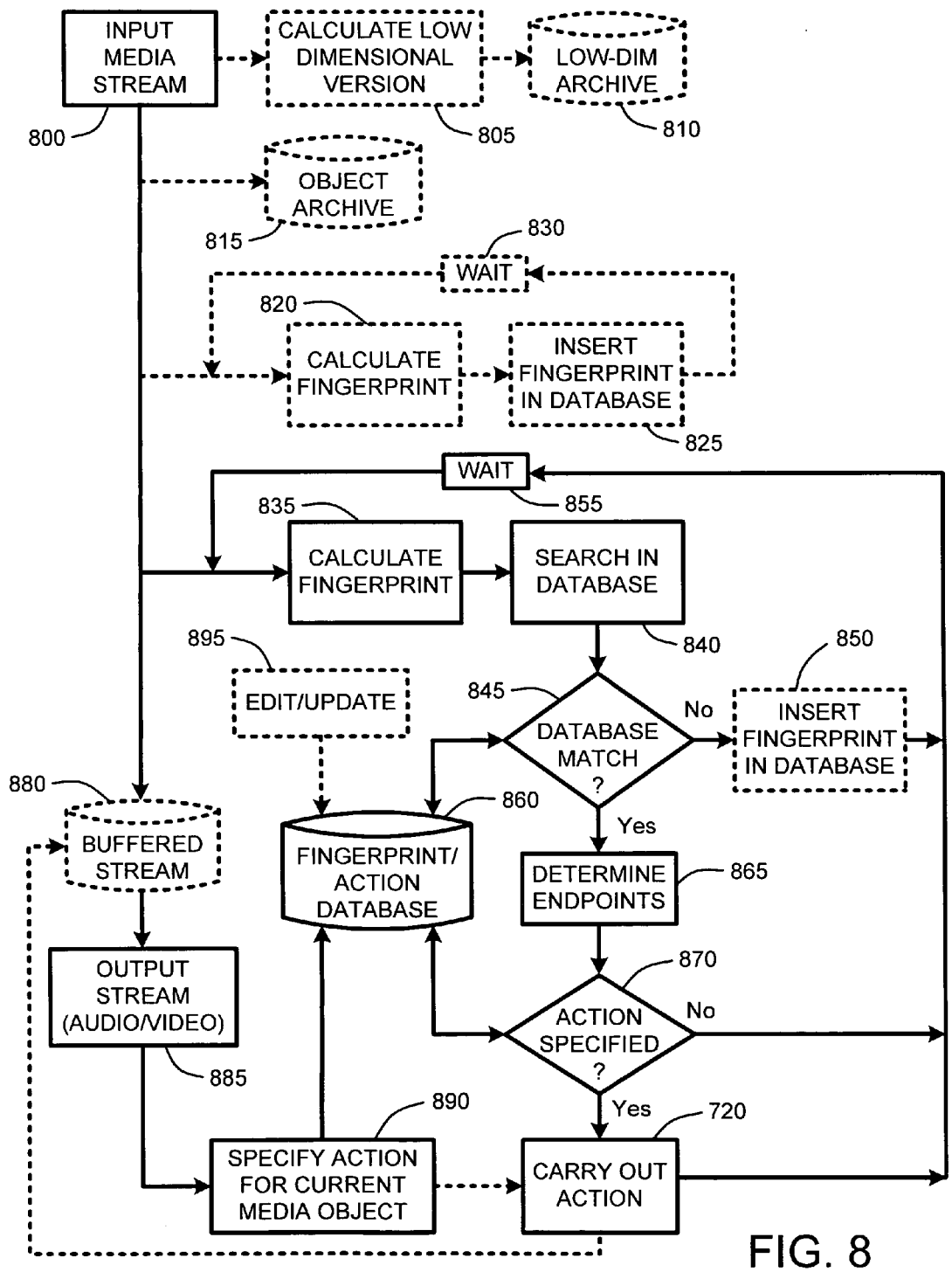
FIG. 8 illustrates an alternate exemplary system flow diagram for providing user control over repeating objects embedded in a media stream.

3.2.6 Alternate Operation of the ROC:

Referring now to FIG. 8 in combination with FIG. 3, in another embodiment, the process can again be generally described as media controller which provides interactive user control over repeating objects in a media stream. In particular, as illustrated by the alternate embodiment of FIG. 8, a system and method for providing both automatic and real-time user control over repeating audio and/or video objects identified within one or more media streams begins by inputting a media stream 800 containing audio and/or video information. This media stream is again preferably buffered 880 prior to output 885 or playback of the media stream to allow for perceptually seamless deletion, insertion, or replacement of particular objects within the media stream.

In one embodiment, prior to buffered playback 885, a low dimensional version of the media stream is calculated 805 and stored to a low-dimensional archive 810. This low dimensional archive 810 is used for direct comparisons of the media stream when identifying repeating objects and determining their endpoints as described above. Alternately, the media stream is simply archived 815 without first computing a low-dimensional version of the media stream. Again, this archive 815 is used for direct comparisons of the media stream when identifying repeating objects and determining their endpoints as described above.

In still another embodiment, fingerprints are computed 820 from the media stream and stored to a fingerprint database 825 at some desired frequency by reading a portion of the media stream, computing and storing the fingerprint, then waiting 830 for some predetermined period. In a tested embodiment, it was found that populating the fingerprint database with fingerprints at an interval approximately ten to twenty milliseconds provided for a robust fingerprint database. These fingerprints are then used in subsequent comparisons to the media stream, where a second set of fingerprints may be computed at a lower rate or frequency then compared to entries in the fingerprint database for determining whether an object is being repeated within the media stream. However, it should be noted that a number of conventional fingerprinting schemes can achieve robust recognition of objects. The details of how frequently the fingerprints need to be written to the database, and how frequently the database needs to be checked will vary with the particulars of the actual fingerprinting technique that is used.

In another embodiment, a fingerprint is computed 835 from the media stream, followed by a search 840 of a fingerprint/action database 860 to determine whether there is a database match 845 that would indicate the presence of a repeating media object within the media stream. In this embodiment, if there is no match 845, then the computed fingerprint is added 850 to the fingerprint/action database 860, followed by a wait 855 for a predetermined period before computing a new fingerprint 835 from the media stream.

If a database match 845 is identified by the database search 840, then the presence of a repeating media object within the media stream is indicated. If the current portion of the media stream does represent a repeat object then the endpoints of that object are determined 865. Next, given the endpoints of the object, the fingerprint/action database 860 is queried to determine whether an action is specified 870 for that object. (See FIG. 9 for a non-exclusive list of exemplary actions that may be associated with repeating media objects).

If no action is associated with the current repeat media object, then system then waits 855 for a next portion of the media stream before again calculating a fingerprint 835 and again searching the database 840 to determine whether a repeating media object is present within the stream. However, if an action is specified 870 for the repeating media object, then that action is carried out as described above. Once the specified action is carried out, the system again waits 855 for a next portion of the media stream before again calculating a fingerprint 835 and again searching the database 840 to determine whether a repeating media object is present within the stream.

Again, while the database search 840 for identifying repeating objects is being conducted along with a check of the fingerprint/action database for associated actions, the media stream is also being output 885. Further, as described above, while not necessary, for optimal performance, it is again preferred that the media stream is buffered 880 prior to output 885 or playback so that changes can be made to the buffered media stream, in accordance with any actions that are associated with particular repeat media objects.

Next, during output 885 or playback of the media stream, the user can specify an action 890 for the current object, via a graphical user interface, remote control, voice command, or any combination of such input types. The specified command is then entered into the fingerprint/action database. Further, if the action or command entered for the currently playing media object is for a previously identified repeating object, then the endpoints will have already been determined, as described above. Consequently, the command will be acted upon immediately, regardless of how far into the media object playback has progressed. However, where the currently playing media object represents a first occurrence of the object within the media stream, the endpoints of that object will not have been determined, so the command will be stored in the fingerprint/action database 860 for automatic action upon the next occurrence of that particular media object. In certain cases, repeating instances of various objects can vary in length each time they recur. Therefore, in this case it may be preferable to recalculate the endpoints for each new instance of the object that occurs.

In one embodiment, the fingerprint/action database 860 is updated or edited 895 via a conventional user interface. In this embodiment, the user is provided with the capability to browse the database and view particular commands associated with particular media objects. The user can then edit, add, or update commands as described above with respect to FIG. 7.

Finally, in yet another embodiment the user can also group objects in the database by property, or groups of properties, and apply the same or a similar action to all objects sharing that property or properties. For example, a user might wish to apply the same action to all objects which are less than 60 seconds in length and have appeared at least once in the last 4 days. Thus the full power of a database to select and group objects by properties can be employed to associate actions with objects with similar properties. Further, the user is also provided with the capability to specifically include or exclude particular objects from any such subset.

4.0 Additional Objector Extractor Embodiments:

As noted above, media streams captured for purposes of segmenting and identifying repeating media objects and their endpoints can be derived from any conventional broadcast source, such as, for example, an audio, video, or audio/video broadcast via radio, television, the Internet, or other network. With respect to a combined audio/video broadcast, as is typical with television-type broadcasts, it should be noted that the audio portion of the combined audio/video broadcast is synchronized with the video portion. In other words, as is well known, the audio portion of an audio/video broadcast coincides with the video portion of the broadcast. Consequently, identifying repeating audio objects within the combined audio/video stream is a convenient and computationally inexpensive way to identify repeating video objects within the audio/video stream.

In particular, in one embodiment, by first identifying repeating audio objects in the audio stream, identifying the times $t_b$ and $t_e$ at which those audio objects begin and end (i.e., the endpoints of the audio object), and then segmenting the audio/video stream at those times, video objects are also identified and segmented along with the audio objects from the combined audio/video stream.

For example, a typical commercial or advertisement is often seen to frequently repeat on any given day on any given television station. Recording the audio/video stream of that television station, then processing the audio portion of the television broadcast will serve to identify the audio portions of those repeating advertisements. Further, because the audio is synchronized with the video portion of the stream, the location of repeating advertisements within the television broadcast can be readily determined in the manner described above. Once the location is identified, such advertisements can be flagged for any special processing desired.

The foregoing description of the invention has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the object extractor described herein. It is intended that the scope of the invention be limited not by this detailed description, but rather by the claims appended hereto.

What is claimed is:

1. A system for controlling repeating media objects a media stream, comprising using a computing device to:
   provide a buffered playback of a media stream;
   examine the buffered media stream to identify at least one instance when one or more unique media objects repeats in the buffered media stream;
   align a portion of the buffered media stream centered around one or more repeating instances of one or more unique media object with portions of the buffered media stream centered around one or more other repeating instances of those unique media objects;
   compare the aligned portions of the buffered media stream to determine pairs of temporal endpoints for delimiting one or more repeating instance of one or more unique media object in the media stream; and
   automatically perform at least one user specified action associated with one or more repeating instances of particular media objects during the buffered playback of the media stream.

2. The system of claim 1 wherein at the least one action to be taken is specified during the buffered playback of the media stream, said action being automatically associated with one or more successive repeating instances of the media object currently being played at the time that the at least one action is specified.

3. The system of claim 1 further comprising a user interface for specifying the at least one user specified action.

4. The system of claim 3 wherein the user interface is accessed by the user via a remote control device for specifying the at least one user specified action.

5. The system of claim 3 wherein the user interface is accessed by the user via a voice recognition system for specifying the at least one user specified.

6. The system of claim 1 wherein the at least one user specified action includes fast forwarding through a media object during playback of the media stream.

7. The system of claim 1 wherein the at least one user specified action includes slowing playback of the media object during playback of the media stream.

8. The system of claim 1 wherein the at least one user specified action includes changing the media stream during playback of the media stream.

9. The system of claim 1 wherein the at least one user specified action includes adding a media object to a favorites list during playback of the media stream.

10. The system of claim 1 wherein the at least one user specified action includes rating a media object during playback of the media stream.

11. The system of claim 1 wherein the at least one user specified action includes automatically changing a playback volume for particular media objects during playback of the media stream.

12. The system of claim 1 wherein the at least one user specified action includes automatically blanking a display screen when a particular media object is detected during playback of the media stream.

13. The system of claim 1 wherein the at least one user specified action includes skipping to the end of a currently playing media object during playback of the media stream.

14. The system of claim 1 wherein the at least one user specified action includes deleting each repeating instance of a particular media object from the media stream during playback of the media stream.

15. The system of claim 1 wherein the at least one user specified action includes automatically extracting and saving a copy of a currently playing media object during playback of the media stream.

16. The system of claim 1 wherein the at least one user specified action includes limiting a particular media object to a maximum number of repeating occurrences during a predefined period during playback of the media stream.

17. The system of claim 1 wherein the at least one user specified action includes limiting a relative frequency of playback of one or more particular media objects relative to other media objects.

18. The system of claim 1 wherein the at least one user specified action includes automatically replacing particular media objects in the media stream with another previously stored media object during playback of the media stream.

19. system of claim 1 wherein the at least one user specified action includes automatically jumping from a buffered playback of the media stream to a real-time playback of the media stream during the buffered playback of the media stream.

20. The system of claim 19 wherein the at least one user specified action includes automatically jumping from the real-time playback to the buffered playback of the media stream.

21. The system of claim 1 wherein the at least one user specified action includes rewinding to the beginning of a particular media object during playback.

22. A physical computer storage media having computer executable instructions stored therein for controlling repeating media objects within a media stream, comprising steps for:
 buffering an incoming media stream for a predetermined period of time;
 providing a buffered playback of the buffered media stream;
 extracting a segment of the media stream;
 comparing the extracted segment of the buffered media stream to the remainder of the currently buffered media stream to identify repeating content in the media stream where at least a part of the extracted segment matches one or more other parts of the media stream;
 for at least one instance of repeating content within the currently buffered media stream, aligning a portion of the media stream centered on that instance of repeating content with a portion of the media stream centered on at least one other instance of repeating content;
 comparing each of the aligned portions of the media stream to identify a pair of temporal endpoints for defining temporal boundaries of each repeating media object; and
 specifying at least one command to be associated with at least one repeating media object, said command to be executed upon each instance of the repeating media object identified within the currently buffered media stream.

23. The computer storage media of claim 22 further comprising a step for flagging each portion of the media stream between each pair of temporal endpoints as being identified.

24. The computer storage media of claim 23 further comprising a step for continuing to extract new segments of the media stream from one or more portions of the media stream which have not been flagged as being identified, and identifying repeating media objects corresponding to the each extracted segment.

25. The computer storage media of claim 22 wherein the media stream is an audio media stream.

26. The computer storage media of claim 22 wherein the media stream is a video stream.

27. The computer storage media of claim 22 wherein the media objects are any of songs, music, advertisements, video clips, station identifiers, speech, images, and image sequences.

28. The computer storage media of claim 22 further comprising a step for storing at least one representative copy of each repeating media object on a computer readable medium.

29. The computer storage media of claim 22 further comprising at least one of:
 a computer user interface for specifying the at least one command during the buffered playback of the media stream;
 a remote control device for specifying the at least one command during the buffered playback of the media stream; and
 a voice recognition system for specifying the at least one command during the buffered playback of the media stream.

30. The computer storage media of claim 22 wherein specifying the at least one command comprises specifying at least one of:
 fast forwarding through a media object during playback of the media stream;
 slowing playback of the media object during playback of the media stream;
 changing the media stream during playback of the media stream;
 adding a media object to a favorites list during playback of the media stream;
 rating a media object during playback of the media stream;
 automatically changing a playback volume for particular media objects during playback of the media stream;
 automatically blanking a display screen when a particular media object is detected during playback of the media stream;
 skipping to the end of particular media objects within the media stream during playback of the media stream;
 deleting particular media objects from the media stream during playback of the media stream;
 extracting and saving a copy of particular media objects from the media stream during playback of the media stream;
 limiting a particular media object to a maximum number of occurrences during a predefined period during playback of the media stream;

limiting a relative frequency of playback of one or more particular media objects relative to other media objects;

rewinding to the beginning of a particular media object during playback;

automatically replacing particular media objects in the media stream with another previously stored media object during playback of the media stream;

automatically jumping from a buffered playback of the media stream to a real-time playback of the media stream on the occurrence of one or more predefined events during playback of the media stream;

automatically jumping from a real-time playback to a buffered playback on the occurrence of one or more predefined events; and user defined actions.

31. A computer-implemented process for controlling repeating media objects within a media stream, comprising using a computing device to perform process actions for:

buffering a media stream;

providing a playback of the buffered media stream;

on an ongoing basis during playback of the buffered media stream, selecting a portion of the media stream;

sequentially comparing each selected portion of the media stream to subsequent portions of the media stream to identify at least one instance within the buffered media stream wherein a part of the selected portion at least partially matches a part of any of the subsequent portions;

extracting a segment of the buffered media stream centered on the matching part of at least one of the compared portions;

simultaneously aligning two or more of the extracted segments with each other;

determining locations within the media stream of repeating media objects by determining forward and backward points where the simultaneously aligned segments of the media stream diverge; and automatically performing any command associated with at least one identified repeat instance of particular media objects during playback of the buffered media stream relative to the locations within the media stream of the identified repeating media objects.

32. The computer-implemented process of claim 31 further comprising automatically specifying at least one additional command to be associated with one or more media objects during playback of the at least one media stream.

33. The computer-implemented process of claim 31 further comprising a user interface for manually specifying at least one additional command to be associated with one or more media objects during playback of the at least one media stream.

34. The computer-implemented process of claim 33 wherein the computer user interface is a text-based computer user interface.

35. The computer-implemented process of claim 33 wherein the computer user interface is a graphical computer user interface.

36. The computer-implemented process of claim 33 wherein the user interface includes a remote control device for specifying at least one additional command to be associated with one or more media objects during playback of the at least one media stream.

37. The computer-implemented process of claim 33 wherein the user interface includes a voice recognition system for specifying at least one additional command to be associated with one or more media objects during playback of the at least one media stream.

* * * * *